US009012585B2

(12) United States Patent
Brandstadt et al.

(10) Patent No.: US 9,012,585 B2
(45) Date of Patent: Apr. 21, 2015

(54) ZINC CONTAINING COMPLEX AND CONDENSATION REACTION CATALYSTS, METHODS FOR PREPARING THE CATALYSTS, AND COMPOSITIONS CONTAINING THE CATALYSTS

(75) Inventors: Kurt Brandstadt, Midland, MI (US); Simon Cook, Midland, MI (US); Gary Diamond, Menlo Park, CA (US); Keith Hall, San Jose, CA (US); Loren Lower, Sanford, MI (US); Avril Surgenor, Waterloo (BE); Richard Taylor, Penarth (GB); James Tonge, Sanford, MI (US); Ming-Shin Tzou, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 14/117,485

(22) PCT Filed: Jul. 19, 2012

(86) PCT No.: PCT/US2012/047280
§ 371 (c)(1),
(2), (4) Date: Nov. 13, 2013

(87) PCT Pub. No.: WO2013/012977
PCT Pub. Date: Jan. 24, 2013

(65) Prior Publication Data
US 2014/0221593 A1    Aug. 7, 2014

Related U.S. Application Data

(60) Provisional application No. 61/509,784, filed on Jul. 20, 2011.

(51) Int. Cl.
*C08G 77/00* (2006.01)
*C08G 77/08* (2006.01)
*C08L 83/04* (2006.01)
*C08K 5/00* (2006.01)
*B01J 31/18* (2006.01)
*B01J 31/22* (2006.01)
*C08K 5/56* (2006.01)

(52) U.S. Cl.
CPC . *C08G 77/08* (2013.01); *C08K 5/56* (2013.01); *C08L 83/04* (2013.01); *C08K 5/0091* (2013.01); *B01J 31/1815* (2013.01); *B01J 31/2217* (2013.01); *B01J 31/226* (2013.01); *B01J 2231/14* (2013.01); *B01J 2531/26* (2013.01)

(58) Field of Classification Search
USPC .......................................................... 528/14
See application file for complete search history.

(56) References Cited

U.S. PATENT DOCUMENTS

| 4,808,664 | A  | 2/1989  | Saam            |
| 4,900,772 | A  | 2/1990  | Imanaka et al.  |
| 4,962,153 | A  | 10/1990 | Liles           |
| 5,051,455 | A  | 9/1991  | Chu et al.      |
| 5,053,442 | A  | 10/1991 | Chu et al.      |
| 5,055,502 | A  | 10/1991 | Frances et al.  |
| 5,073,586 | A  | 12/1991 | Berthet et al.  |
| 5,262,502 | A  | 11/1993 | Fujisawa et al. |
| 5,804,616 | A  | 9/1998  | Mowrer et al.   |
| 6,001,888 | A  | 12/1999 | Friebe et al.   |
| 6,177,528 | B1 | 1/2001  | LaPointe et al. |
| 6,350,916 | B1 | 2/2002  | Guram et al.    |
| 6,362,309 | B1 | 3/2002  | Lund et al.     |
| 7,078,164 | B1 | 7/2006  | Diamond et al.  |
| 7,365,145 | B2 | 4/2008  | Yang et al.     |
| 7,498,363 | B2 | 3/2009  | Bublewitz et al.|
| 7,504,468 | B2 | 3/2009  | Guennouni et al.|
| 7,858,706 | B2 | 12/2010 | Arriola et al.  |
| 7,960,577 | B2 | 6/2011  | Prasse          |
| 8,012,381 | B2 | 9/2011  | Taguchi et al.  |
| 8,053,529 | B2 | 11/2011 | Carnahan et al. |
| 8,088,869 | B2 | 1/2012  | Joseph et al.   |
| 8,101,251 | B2 | 1/2012  | Scott et al.    |
| 8,247,513 | B2 | 8/2012  | Sixt et al.     |
| 8,288,470 | B2 | 10/2012 | Ansems et al.   |
| 8,367,790 | B2 | 2/2013  | Maliverney et al.|
| 8,440,312 | B2 | 5/2013  | Elahee et al.   |
| 8,470,951 | B2 | 6/2013  | Maliverney      |
| 8,481,640 | B2 | 7/2013  | Gough et al.    |
| 8,513,370 | B2 | 8/2013  | Maliverney et al.|
| 8,519,079 | B2 | 8/2013  | Maliverney et al.|
| 2004/0059069 | A1 | 3/2004 | Grimm et al.    |
| 2007/0203316 | A1 | 8/2007 | Inokuchi        |
| 2007/0224641 | A1 | 9/2007 | Campbell        |
| 2008/0118734 | A1 | 5/2008 | Goodwin et al.  |
| 2008/0139731 | A1 | 6/2008 | Lawson et al.   |
| 2008/0300358 | A1 | 12/2008| Cook et al.     |

(Continued)

FOREIGN PATENT DOCUMENTS

| EP | 320259 B1      | 4/1993  |
| GB | 2462156 A      | 2/2010  |
| WO | 02058641 A1    | 8/2002  |
| WO | 2008045417 A3  | 9/2009  |
| WO | 2012134784 A1  | 10/2012 |
| WO | 2013101751 A1  | 7/2013  |

OTHER PUBLICATIONS

Kaptein et al. (J. Org. Chem., 1990, 55, 1890-1901).*
Angulo-Cornejo, Jorge, et. al., "Metal chelates of N-benzothiazol-2-yl, N-benzoxozol-2-yl- and N-(1H-benzimidazol-2-yl)- benzamide", Inorganica Chimica Acta, 2000, 305, pp. 38-45, Germany.

(Continued)

*Primary Examiner* — Kuo-Liang Peng
(74) *Attorney, Agent, or Firm* — Catherine U. Brown

(57) ABSTRACT

A composition is capable of curing via condensation reaction. The composition uses a new condensation reaction catalyst. The new condensation reaction catalyst is used to replace conventional tin catalysts. The composition can react to form a gum, gel, rubber, or resin.

14 Claims, No Drawings

(56) References Cited

U.S. PATENT DOCUMENTS

| | | |
|---|---|---|
| 2010/0113260 A1 | 5/2010 | Hagemeyer |
| 2010/0168309 A1 | 7/2010 | MacKinnon et al. |
| 2010/0184883 A1 | 7/2010 | Detemmerman et al. |
| 2010/0234510 A1 | 9/2010 | Feder et al. |
| 2010/0298467 A1 | 11/2010 | Stammer et al. |
| 2011/0046304 A1 | 2/2011 | Maliverney |
| 2011/0178220 A1 | 7/2011 | Davio et al. |
| 2012/0009366 A1 | 1/2012 | Galbraith et al. |
| 2012/0065308 A1 | 3/2012 | Sumi et al. |
| 2012/0165421 A1 | 6/2012 | Maliverney |
| 2013/0253085 A1 | 9/2013 | Cramer, et. al. |

OTHER PUBLICATIONS

Krebs, Von H., et. al., "Uber Schwermetalikomplexe von Thiosauren", Z. Anorg. Allg. Chemie, BD. 276, pp. 128-140, 1954.

Saumweber, Rupert, et. al., "Synthesis and coordination properties of amphiphilic 3-oxodithiocarboxylic esters", Inorganica Chimica Acta, 269, 1998, pp. 83-90, Germany.

Sen, Sutapa, et. al., "Synthesis, characterization and structural studies of mono- and polynuclar complexes of zinc(II) with 1,10-phenanthroline, 2,2'-bipyridine and 4,4'-bipyridine", Polyhedron, vol. 16, No. 14, pp. 2475-2481, 1997, Great Britain.

\* cited by examiner

ZINC CONTAINING COMPLEX AND CONDENSATION REACTION CATALYSTS, METHODS FOR PREPARING THE CATALYSTS, AND COMPOSITIONS CONTAINING THE CATALYSTS

CROSS REFERENCE TO RELATED APPLICATIONS

This application is a U.S. national stage filing under 35 U.S.C. §371 of PCT Application No. PCT/US12/047280 filed on 19 Jul. 2012, currently pending, which claims the benefit of U.S. Provisional Patent Application No. 61/509,784 filed 20 Jul. 2011 under 35 U.S.C. §119 (e). PCT Application No. PCT/US12/047280 and U.S. Provisional Patent Application No. 61/509,784 are hereby incorporated by reference.

Tin compounds are useful as catalysts for the condensation cure of many polyorganosiloxane compositions, including adhesives, sealants, and low permeability products such as those useful in insulating glass applications, coatings, and silicone elastomer latices. Organotin compounds for condensation reaction catalysis are those where the valence of the tin is either +4 or +2, i.e., Tin (IV) compounds or Tin (II) compounds. Examples of tin (IV) compounds include stannic salts of carboxylic acids such as dibutyl tin dilaurate, dimethyl tin dilaurate, di-(n-butyl)tin bis-ketonate, dibutyl tin diacetate, dibutyl tin maleate, dibutyl tin diacetylacetonate, dibutyl tin dimethoxide, carbomethoxyphenyl tin tris-uberate, dibutyl tin dioctanoate, dibutyl tin diformate, isobutyl tin triceroate, dimethyl tin dibutyrate, dimethyl tin di-neodeconoate, dibutyl tin di-neodeconoate, triethyl tin tartrate, dibutyl tin dibenzoate, butyltintri-2-ethylhexanoate, dioctyl tin diacetate, tin octylate, tin oleate, tin butyrate, tin naphthenate, dimethyl tin dichloride, a combination thereof, and/or a partial hydrolysis product thereof. Tin (IV) compounds are known in the art and are commercially available, such as Metatin® 740 and Fascat® 4202 from Acima Specialty Chemicals of Switzerland, Europe, which is a business unit of The Dow Chemical Company. Examples of tin (II) compounds include tin (II) salts of organic carboxylic acids such as tin (II) diacetate, tin (II) dioctanoate, tin (II) diethylhexanoate, tin (II) dilaurate, stannous salts of carboxylic acids such as stannous octoate, stannous oleate, stannous acetate, stannous laurate, stannous stearate, stannous naphthanate, stannous hexanoate, stannous succinate, stannous caprylate, and a combination thereof.

REACH (Registration, Evaluation, Authorization and Restriction of Chemical) is European Union legislation aimed to help protect human health and the environment and to improve capabilities and competitiveness through the chemical industry. Due to this legislation, tin based catalysts, which are used in many condensation reaction curable polyorganosiloxane products such as sealants and coatings, are to be phased out. Therefore, there is an industry need to replace conventional tin catalysts in condensation reaction curable compositions.

BRIEF SUMMARY OF THE INVENTION

A reaction product of ingredients comprising a zinc precursor (Zn precursor) and a ligand, and methods for preparation of the reaction product are disclosed. A composition, which is capable of forming a product via condensation reaction, comprises the reaction product and a silicon containing base polymer.

DETAILED DESCRIPTION OF THE INVENTION

All amounts, ratios, and percentages are by weight unless otherwise indicated. The amounts of all ingredients in a composition total 100% by weight. The Brief Summary of the Invention and the Abstract are hereby incorporated by reference. The articles 'a', 'an', and 'the' each refer to one or more, unless otherwise indicated by the context of specification. The disclosure of ranges includes the range itself and also anything subsumed therein, as well as endpoints. For example, disclosure of a range of 2.0 to 4.0 includes not only the range of 2.0 to 4.0, but also 2.1, 2.3, 3.4, 3.5, and 4.0 individually, as well as any other number subsumed in the range. Furthermore, disclosure of a range of, for example, 2.0 to 4.0 includes the subsets of, for example, 2.1 to 3.5, 2.3 to 3.4, 2.6 to 3.7, and 3.8 to 4.0, as well as any other subset subsumed in the range. Similarly, the disclosure of Markush groups includes the entire group and also any individual members and subgroups subsumed therein. For example, disclosure of the Markush group a hydrogen atom, an alkyl group, an aryl group, or an aralkyl group includes the member alkyl individually; the subgroup alkyl and aryl; and any other individual member and subgroup subsumed therein.

"Alkyl" means an acyclic, branched or unbranched, saturated monovalent hydrocarbon group. Alkyl is exemplified by, but not limited to, methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, and decyl, as well as branched saturated monovalent hydrocarbon groups of 6 or more carbon atoms.

"Aralkyl" means an alkyl group having a pendant and/or terminal aryl group or an aryl group having a pendant an alkyl group. Exemplary aralkyl groups include benzyl, phenylethyl, phenyl propyl, and phenyl butyl.

"Carbocycle" and "carbocyclic" each means a hydrocarbon ring. Carbocycles may be monocyclic or alternatively may be fused, bridged, or spiro polycyclic rings. Monocyclic carbocycles may have 3 to 9 carbon atoms, alternatively 4 to 7 carbon atoms, and alternatively 5 to 6 carbon atoms. Polycyclic carbocycles may have 7 to 17 carbon atoms, alternatively 7 to 14 carbon atoms, and alternatively 9 to 10 carbon atoms. Carbocycles may be saturated or partially unsaturated.

"Cycloalkyl" means a saturated carbocycle. Monocyclic cycloalkyl groups are exemplified by cyclobutyl, cyclopentyl, and cyclohexyl.

"Heterocycle" and "heterocyclic" each mean a ring group comprised of carbon atoms and one or more heteroatoms in the ring. The heteroatom may be N, 0, P, S, or a combination thereof. Heterocycles may be monocyclic or alternatively may be fused, bridged, or spiro polycyclic rings. Monocyclic heterocycles may have 3 to 9 member atoms in the ring, alternatively 4 to 7 member atoms, and alternatively 5 to 6 member atoms. Polycyclic heterocycles may have 7 to 17 member atoms, alternatively 7 to 14 member atoms, and alternatively 9 to 10 member atoms. Heterocycles may be saturated or partially unsaturated.

"Halogenated hydrocarbon" means a hydrocarbon where one or more hydrogen atoms bonded to a carbon atom have been formally replaced with a halogen atom. Halogenated hydrocarbon groups include haloalkyl groups, halogenated carbocyclic groups, and haloalkenyl groups. Haloalkyl groups include fluorinated alkyl groups such as trifluoromethyl, fluoromethyl, trifluoroethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl; and chlorinated alkyl groups such as chloromethyl and 3-chloropropyl. Halogenated carbocyclic groups include fluorinated cycloalkyl groups such as 2,2-difluorocyclopropyl, 2,3-difluorocyclobutyl, 3,4-difluorocyclohexyl, and 3,4-difluoro-5-methylcycloheptyl; and chlorinated cycloalkyl groups such as 2,2-dichlorocyclopropyl, 2,3-dichlorocyclopentyl. Haloalkenyl groups include allyl chloride.

"Heteroatom" means any of the Group 13-17 elements of the IUPAC Periodic Table of the Elements at http://www.iupac.org/fileadmin/user_upload/news/IUPAC_Periodic_Table-1Jun12.pdf, except carbon. "Heteroatom" include, for example, N, 0, P, S, Br, Cl, F, and I.

"Heteroatom containing group" means an organic group comprised of hydrogen atoms and carbon atoms and that also includes at least one heteroatom. Heteratom containing groups may include, for example, one or more of acyl, amide, amine, carboxyl, cyano, epoxy, halogen, hydrocarbonoxy, imino, ketoxime, mercapto, oxo, oxygen, oxime, and/or thiol. For example, when the heteroatom containing group contains one or more halogen atoms, then the heteroatom containing group may be a halogenated hydrocarbon group as defined above. Alternatively, when the heteroatom is oxygen, then the heteroatom containing group may be a hydrocarbonoxy group such as an alkoxy group or an alkylalkoxy group.

"Heteroalkyl" group means an acyclic, branched or unbranched, saturated monovalent hydrocarbon group that also includes at least one heteroatom. "Heteroalkyl" includes haloalkyl groups and alkyl groups in which at least one carbon atom has been replaced with a heteroatom such as N, O, P, or S, e.g., when the heteroatom is O, the heteroalkyl group may be an alkoxy group.

"Free of" means that the composition contains a non-detectable amount of the ingredient, or the composition contains an amount of the ingredient insufficient to change the visual viscosity measured as described in the Examples section, as compared to the same composition with the ingredient omitted. For example, the composition described herein may be free of tin catalysts. "Free of tin catalysts" means that the composition contains a non-detectable amount of a tin catalyst capable of catalyzing a condensation reaction with the hydrolyzable groups on other ingredients in the composition, or the composition contains an amount of a tin catalyst insufficient to change the visual viscosity measured as described in the Examples section, as compared to the same composition with the tin catalyst omitted. The composition may be free of titanium catalysts. "Free of titanium catalysts" means that the composition contains a non-detectable amount of a titanium catalyst capable of catalyzing a condensation reaction with the hydrolyzable groups on other ingredients in the composition, or the composition contains an amount of a titanium catalyst insufficient to change the visual viscosity measured as described in the Examples section, as compared to the same composition with the titanium catalyst omitted. Alternatively, the composition described herein may be free of metal condensation reaction catalysts (i.e., other than ingredient (A) described herein). "Free of metal condensation reaction catalysts" means that the composition contains a non-detectable amount of a compound of a Group 3a, 4a, 5a, or 4b metal of the periodic table (as shown inside the front cover of the CRC Handbook of Chemistry and Physics, 65th ed., CRC Press, Inc., Boca Raton, Fla., 1984), which is capable of catalyzing a condensation reaction, such as compounds of Al, Bi, Sn, Ti, and/or Zr; or an amount of such a metal condensation reaction catalyst insufficient to change the visual viscosity measured as described in the Examples section as compared to the same composition with the metal condensation reaction catalyst omitted. For purposes of this definition 'non-detectable amount' may be measured, for example, according to the method of ASTM D7151-05 Standard Test Method for Determination of Elements in Insulating Oils by Inductively Coupled Plasma Atomic Emission Spectrometry (ICP-AES).

"Non-functional" means that the ingredient, e.g., a polyorganosiloxane, does not have hydrolyzable groups that participate in a condensation reaction.

Abbreviations used herein are defined as follows. The abbreviation "cP" means centiPoise. "DP" means the degree of polymerization of a polymer. "FTIR" means Fourier transform infrared spectroscopy. "GPC" means gel permeation chromatography. "Mn" means number average molecular weight. Mn may be measured using GPC. "Mw" means weight average molecular weight. "NMR" means nuclear magnetic resonance. "Me" means methyl. "Et" means ethyl. "Ph" means phenyl. "Pr" means propyl and includes various structures such as iPr and nPr. "iPr" means isopropyl. "nPr" means normal propyl. "Bu" means butyl and includes various structures including nBu, sec-butyl, tBu, and iBu. "iBu" means isobutyl. "nBu" means normal butyl. "tBu" means tert-butyl.

A composition, which has at least one ingredient capable of reacting by condensation reaction (composition), comprises:
(A) a Zn containing condensation reaction catalyst, and
(B) a silicon containing base polymer (base polymer) having an average, per molecule, of one or more hydrolyzable substituents. Without wishing to be bound by theory, it is thought that the Zn containing condensation reaction catalyst is characterizable as being effective for catalyzing the condensation reaction of the base polymer. The base polymer has hydrolyzable substituents capable of reacting by condensation reaction. The condensation reaction of the base polymer prepares a reaction product. The composition may optionally further comprise one or more additional ingredients. The one or more additional ingredients are distinct from ingredients (A) and (B). Suitable additional ingredients are exemplified by (C) a crosslinker; (D) a drying agent; (E) an extender, a plasticizer, or a combination thereof; (F) a filler; (G) a filler treating agent; (H) a biocide; (J) a flame retardant; (K) a surface modifier; (L) a chain lengthener; (M) an endblocker; (N) a nonreactive binder; (O) an anti-aging additive; (P) a water release agent; (Q) a pigment; (R) a rheological additive; (S) a vehicle (such as a solvent and/or a diluent); (T) a tackifying agent; (U) a corrosion inhibitor; and a combination thereof.

Ingredient (A) comprises a catalytically effective amount of the Zn containing condensation reaction catalyst. The Zn containing condensation reaction catalyst comprises a reaction product of a Zn precursor and a ligand. Without wishing to be bound by theory, it is thought that this reaction product comprises a Zn-ligand complex. The Zn precursor is distinct from a reaction product of the Zn precursor and the ligand. The Zn precursor is an organic compound of Zn having general formula (i): $Zn-A_2$, where each Zn is a Zinc atom, each A is independently a displaceable substituent. Each A may be a monovalent organic group. Examples of monovalent organic groups for A include monovalent hydrocarbon groups, amino groups, silazane groups, carboxylic ester groups, and hydrocarbonoxy groups.

Examples of monovalent hydrocarbon groups for A include, but are not limited to, alkyl such as methyl, ethyl, propyl, butyl, pentyl, hexyl, heptyl, ethylhexyl, octyl, decyl, dodecyl, undecyl, and octadecyl; alkenyl such as vinyl, allyl, propenyl, and hexenyl; carbocyclic groups exemplified by saturated carbocyclic groups, e.g., cycloalkyl such as cyclopentyl and cyclohexyl, or unsaturated carbocyclic groups such as cyclopentadienyl or cyclooctadienyl; aryl such as phenyl, tolyl, xylyl, mesityl, and naphthyl; and aralkyl such as benzyl or 2-phenylethyl. Alternatively, each A may be an alkyl group, such as linear and branched alkyl groups such as methyl, ethyl, iPr, and nBu; and cycloalkyl such as cyclopentyl. Alternatively, each A may be an ethyl group.

Examples of amino groups for A have formula —NA$'_2$, where each A' is independently a hydrogen atom or a monovalent hydrocarbon group. Exemplary monovalent hydrocarbon groups for A' include, but are not limited to, alkyl such as methyl, ethyl, propyl, butyl, pentyl, hexyl, heptyl, ethylhexyl, octyl, decyl, dodecyl, undecyl, and octadecyl; alkenyl such as vinyl, allyl, propenyl, and hexenyl; carbocyclic groups exemplified by saturated carbocyclic groups, e.g., cycloalkyl such as cyclopentyl and cyclohexyl, or unsaturated carbocyclic groups such as cyclopentadienyl or cyclooctadienyl; aryl such as phenyl, tolyl, xylyl, mesityl, and naphthyl; and aralkyl such as benzyl or 2-phenylethyl. Alternatively, each A' may be a hydrogen atom or an alkyl group of 1 to 4 carbon atoms, such as methyl or ethyl.

Alternatively, each A in general formula (i) may be a silazane group.

Alternatively, each A in general formula (i) may be a carboxylic ester group. Examples of suitable carboxylic ester groups for A include, but are not limited to ethylhexanoate (such as 2-ethylhexanoate), neodecanoate, octanoate, and stearate. Alternatively, A may be selected from ethylhexanoate and octanoate. Alternatively, each A may be an octanoate group.

Examples of monovalent hydrocarbonoxy groups for A may have formula —O-A", where A" is a monovalent hydrocarbon group. Examples of monovalent hydrocarbon groups for A" include, but are not limited to, alkyl such as methyl, ethyl, propyl, butyl, pentyl, hexyl, heptyl, ethylhexyl, octyl, decyl, dodecyl, undecyl, and octadecyl; alkenyl such as vinyl, allyl, propenyl, and hexenyl; cycloalkyl such as cyclopentyl and cyclohexyl; aryl such as phenyl, tolyl, xylyl, and naphthyl; aralkyl such as benzyl or 2-phenylethyl. Alternatively, each A" may be an alkyl group, such as methyl, ethyl, n-propyl, iso-propyl, n-butyl, iso-butyl, or t-butyl. Alternatively, each A" may be an alkyl group, and alternatively each A" may be ethyl, propyl such as iso-propyl or n-propyl, or butyl.

Alternatively, each A may be an alkyl group, such as methyl, ethyl, n-propyl, iso-propyl, n-butyl, iso-butyl, or t-butyl. Alternatively, each A may be selected from the group consisting of ethyl, benzyl, mesityl, phenyl,-NEt$_2$, cyclooctadiene, ethoxide, iso-propoxide, butoxide, 2-ethylhexanoate, neodecanoate, octanoate, and stearate.

Organic compounds of Zn suitable for use as precursors are commercially available. For example, dialkyl zinc compounds such as Zn-Et$_2$ and diaryl zinc compounds such as compounds of zinc such as Zn-Ph$_2$ are commercially available from Sigma-Aldrich of St. Louis, Mo., U.S.A. Diesters of zinc, such as Zn(octanoate)$_2$, are commercially available from City Chemicals LLC of West Haven, Conn., U.S.A.

The ligand is an organic compound that coordinates with Zn. The organic compound includes neutral and conjugate base forms. Without wishing to be bound by theory, it is thought that the ligand displaces one or more instances of displaceable substituent A in the Zn precursor. The ligand may have general formula (ii):

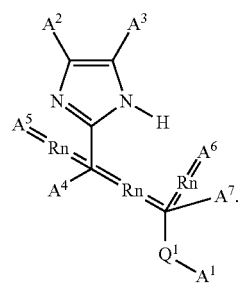

In general formula (ii), a bond with 'Rn' in the formula represents a covalent single bond or an aromatic bond forming part of a ring structure. $Q^1$ is a heteroatom, which may be selected from O and S.

In general formula (ii), each $A^2$ and each $A^3$ is independently selected from a hydrogen atom and a monovalent hydrocarbon group. Suitable monovalent hydrocarbon groups include alkyl groups of 1 to 8 carbon atoms, carbocyclic groups of 5 or 6 carbon atoms, aryl groups of 6 to 9 carbon atoms, and aralkyl groups of 6 to 11 carbon atoms. Alternatively, each $A^2$ and each $A^3$ is an aryl group.

In general formula (ii), each of $A^4$, $A^5$, $A^6$, and $A^7$ is independently selected from a hydrogen atom and a monovalent organic group. The monovalent organic group may be a monovalent hydrocarbon group or a monovalent heteroatom containing group such as a monovalent halogenated hydrocarbon group. Suitable monovalent hydrocarbon groups include alkyl groups of 1 to 8 carbon atoms, carbocyclic groups of 5 or 6 carbon atoms, aryl groups of 6 to 9 carbon atoms, and aralkyl groups of 6 to 11 carbon atoms. Alternatively, $A^5$ and $A^6$ may be bonded together to form a ring structure such as a carbocycle, an aryl group, an aralkyl group or a heterocyclic group. When $A^5$ and $A^6$ are bonded together to form a ring, then $A^4$ and $A^7$ may be H.

In general formula (v), $A^1$ is either a monovalent hydrocarbon group or a divalent linking group. Suitable monovalent hydrocarbon groups for $A^1$ include alkyl, aryl, and aralkyl. Examples of divalent linking groups for $A^1$ include alkylene such as ethylene, propylene, or hexylene; arylene such as phenylene, or alkylarylene such as:

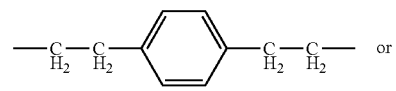

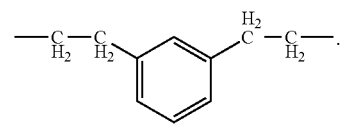

When $A^1$ is a divalent linking group, then $A^1$ may link the structure of general formula (ii) with a structure of general formula (iii):

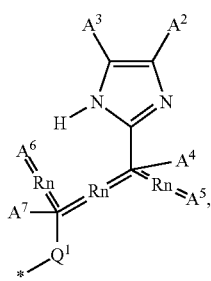

where $A^2$, $A^3$, $A^4$, $A^5$, $A^6$, and $A^7$ are as defined above. Examples of ligands of general formula (ii) include Ligand 1 and Ligand 2 shown in Table 1.

The neutral forms of suitable ligands of general formula (ii) are shown below in Table 1.

TABLE 1

Ligands

| Ligand | Structure |
|---|---|
| 1 | (2-methoxyphenyl)-4,5-diphenyl-1H-imidazole structure |
| 2 | (2-methylthiophenyl)-4,5-diphenyl-1H-imidazole structure |
| 3 | 2,2'-bipyridine structure |

Certain ligands in Table 1 are commercially available. For example, ligand 1 is 2-(2-METHOXYPHENYL)-4,5-DIPHENYL-1H-IMIDAZOLE from Sigma-Aldrich of St. Louis, Mo., U.S.A. Ligand 3 is commercially available from Strem Chemicals, Inc. of Newburyport, Mass., U.S.A.

The ligand used to prepare ingredient (A) may be a ligand shown in Table 1. Alternatively, the ligand may be selected depending on various factors including the selection of precursor. For example, when the precursor is a dialkyl zinc compound, such as diethyl zinc, then the ligand may be ligand 2 from Table 1. Alternatively, when the precursor is a diester zinc compound, such as zinc dioctanoate, then the ligand may be ligand 1 from Table 1.

Ingredient (A) may be prepared by a method comprising reacting the ligand and the Zn precursor, described above, thereby forming a catalytically active reaction product comprising the Zn-ligand complex. The method may optionally further comprise a step of dissolving either the Zn precursor, or the ligand, or both, in a solvent before combining the Zn precursor and the ligand. Suitable solvents are exemplified by those described below for ingredient (S). Alternatively, the ligand may be dissolved in a solvent in a container, and the solvent may thereafter be removed before adding the Zn precursor to the container with the ligand. The amounts of ligand and Zn precursor are selected such that the mole ratio of ligand to Zn precursor (Ligand:Metal Ratio) may range from 1:1 to 10:1, alternatively 1:1 to 3:1, and alternatively 1:1 to 2:1. Combining the Zn precursor and the ligand may be performed by any convenient means, such as mixing them together in or shaking the container.

Reacting the Zn precursor and ligand may be performed by any convenient means such as allowing the Zn precursor and ligand prepared as described above to react at room temperature (RT) of 25° C. for a period of time, or by heating. Heating may be performed by any convenient means, such as via a heating mantle, heating coil, or placing the container in an oven. The reaction temperature depends on various factors including the reactivities of the specific Zn precursor and ligand selected and the Ligand:Metal Ratio, however, temperature may range from 25° C. to 200° C., alternatively 25° C. to 75° C. Reaction time depends on various factors including the reaction temperature selected, however, reaction time may range from 1 minute to 48 hours, alternatively 45 minutes (min) to 60 min. The ligand and Zn precursor may be combined and heated sequentially. Alternatively, the ligand and Zn precursor may be combined and heated concurrently.

The method of preparing the catalytically active reaction product of ingredient (A) may optionally further comprise adding a solvent after the reaction. Suitable solvents are exemplified by those described below for ingredient (S). Alternatively, the method may optionally further comprise removing a reaction by-product and/or the solvent, if the solvent is present (e.g., used to facilitate combination of the Zn precursor and the ligand before or during heating). By-products include, for example, H-A (where A is as defined above in general formula (i)) or any species resulting from reacting an organic group off the Zn precursor when the ligand reacts with the Zn precursor. By-products may be removed by any convenient means, such as stripping or distillation, with heating or under vacuum, or a combination thereof. The resulting isolated Zn-ligand complex may be used as the catalytically active reaction product of ingredient (A).

Alternatively, the reaction by-products are not removed before using the catalytically active reaction product as ingredient (A). For example, the ligand and Zn precursor may be reacted as described above, with or without solvent removal, and the resulting catalytically active reaction product (comprising the Zn-ligand complex and the reaction by-product and optionally a solvent or diluent) may be used as ingredient (A). Without wishing to be bound by theory, it is thought that a by-product may act as a condensation reaction catalyst in addition to the Zn-ligand complex, or as a co-catalyst or an activator for the Zn-ligand complex. Therefore, the reaction product may catalyze a condensation reaction.

The composition may contain one single catalyst. Alternatively, the composition may comprise two or more catalysts described above as ingredient (A), where the two or more catalysts differ in at least one property such as selection of ligand, selection of precursor, Ligand:Metal Ratio, and definitions for group A in general formula (i). The composition may be free of tin catalysts, alternatively the composition may be free of titanium catalysts, and alternatively the composition may be both free of tin catalysts and free of titanium catalysts. Alternatively, the composition may be free of any Zn compound that would catalyze the condensation reaction of the hydrolyzable groups on ingredient (B) other than ingredient (A). Alternatively, the composition may be free of metal condensation reaction catalysts other than ingredient (A). Alternatively, the composition may be free of any ingredient that would catalyze the condensation reaction of the hydrolyzable groups on ingredient (B) other than ingredient (A).

Ingredient (A) is present in the composition in a catalytically effective amount. The exact amount depends on various factors including reactivity of ingredient (A), the type and amount of ingredient (B), and the type and amount of any additional ingredient, if present. However, the amount of ingredient (A) in the composition may range from 1 part per million (ppm) to 5%, alternatively 0.1% to 2%, and alternatively 1 ppm to 1%, based on total weight of all ingredients in the composition.

Ingredient (B) is a silicon containing base polymer (base polymer). Ingredient (B) comprises a polymer backbone having an average, per molecule, of one or more hydrolyzable substituents covalently bonded thereto. Alternatively, the one or more hydrolyzable substituents are hydrolyzable silyl substituents. The polymer backbone may be selected from a polyorganosiloxane such as a polydiorganosiloxane, an organic polymer backbone, or a silicone-organic copolymer backbone (having the one or more hydrolyzable silyl substituents covalently bonded to an atom in the polymer backbone). Alternatively, the polymer backbone of ingredient (B) may be a polyorganosiloxane backbone, or an organic backbone. Alternatively, the polymer backbone of ingredient (B) may be a polyorganosiloxane backbone. The hydrolyzable substituents are exemplified by hydrogen atoms; halogen atoms; amido groups such as acetamido groups, benzamido groups, or methylacetamido groups; acyloxy groups such as acetoxy groups; hydrocarbonoxy groups such as alkoxy groups or alkenyloxy groups; amino groups; aminoxy groups; hydroxyl groups; mercapto groups; oximo groups; ketoximo groups; alkoxysilylhydrocarbylene groups; or a combination thereof. Alternatively, ingredient (B) may have an average of two or more hydrolyzable substituents per molecule. The hydrolyzable substituent in ingredient (B) may be located at terminal, pendant, or both terminal and pendant positions on the polymer backbone. Alternatively, the hydrolyzable substituent in ingredient (B) may be located at one or more terminal positions on the polymer backbone. Ingredient (B) may comprise a linear, branched, cyclic, or resinous structure. Alternatively, ingredient (B) may comprise a linear, branched or cyclic structure. Alternatively, ingredient (B) may comprise a linear or branched structure. Alternatively, ingredient (B) may comprise a linear structure. Alternatively, ingredient (B) may comprise a linear structure and a resinous structure. Ingredient (B) may comprise a homopolymer or a copolymer or a combination thereof.

Ingredient (B) may have the hydrolyzable substituents contained in groups of the formula (ii):

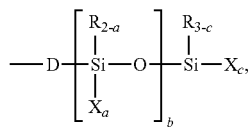

where each D independently represents an oxygen atom, a divalent organic group, a divalent silicone organic group, or a combination of a divalent hydrocarbon group and a divalent siloxane group; each X independently represents a hydrolyzable substituent; each R independently represents a monovalent hydrocarbon group; subscript c represents 0, 1, 2, or 3; subscript a represents 0, 1, or 2; and subscript b has a value of 0 or greater, with the proviso that the sum of (a+c) is at least 1, such that, on average, at least one X is present in the formula. Alternatively, subscript b may have a value ranging from 0 to 18.

Alternatively, each D may be independently selected from an oxygen atom and a divalent hydrocarbon group. Alternatively, each D may be an oxygen atom. Alternatively, each D may be a divalent hydrocarbon group exemplified by an alkylene group such as ethylene, propylene, butylene, or hexylene; an arylene group such as phenylene, or an alkylarylene group such as:

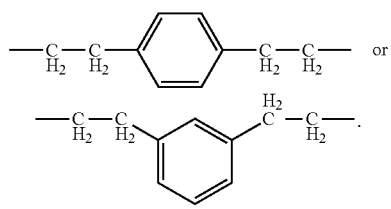

Alternatively, an instance of D may be an oxygen atom while a different instance of D is a divalent hydrocarbon group.

Alternatively, each X may be a hydrolyzable substituent independently selected from the group consisting of an alkoxy group; an alkenyloxy group; an amido group, such as an acetamido, a methylacetamido group, or benzamido group; an acyloxy group such as acetoxy; an amino group; an aminoxy group; a hydroxyl group; a mercapto group; an oximo group; a ketoximo group; and a halogen atom. Alternatively, each X may be independently selected from the group consisting of an alkoxy group, an amido group, an acyloxy group, an amino group, a hydroxyl group, and an oximo group.

Alternatively, each R in the formula above may be independently selected from alkyl groups of 1 to 20 carbon atoms, aryl groups of 6 to 20 carbon atoms, and aralkyl groups of 7 to 20 carbon atoms.

Alternatively, subscript b may be 0.

Ingredient (B) may comprise the groups described by formula (ii) above in an amount of the base polymer ranging from 0.2 mol % to 10 mol %, alternatively 0.5 mol % to 5 mol %, alternatively 0.5 mol % to 2.0 mol %, alternatively 0.5 mol % to 1.5 mol %, and alternatively 0.6 mol % to 1.2 mol %.

Ingredient (B) may have a polyorganosiloxane backbone with a linear structure, i.e., a polydiorganosiloxane backbone. When ingredient (B) has a polydiorganosiloxane backbone, ingredient (B) may comprise an alkoxy-endblocked polydiorganosiloxane, an alkoxysilylhydrocarbylene-endblocked polydiorganosiloxane, a hydroxyl-endblocked polydiorganosiloxane, or a combination thereof.

Ingredient (B) may comprise a polydiorganosiloxane of formula (I):

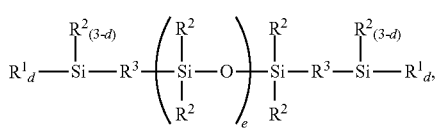

where each $R^1$ is independently a hydrolyzable substituent, each $R^2$ is independently a monovalent organic group, each $R^3$ is independently an oxygen atom or a divalent hydrocarbon group, each subscript d is independently 1, 2, or 3, and subscript e is an integer having a value sufficient to provide the polydiorganosiloxane with a viscosity of at least 100 mPa·s at 25° C. and/or a DP of at least 87. DP may be measured by GPC using polystyrene standards calibration. Alternatively, subscript e may have a value ranging from 1 to 200,000.

Suitable hydrolyzable substituents for $R^1$ include, but are not limited to, the hydrolyzable substituents described above for group X. Alternatively, the hydrolyzable substituents for $R^1$ may be selected from a halogen atom, an acetamido group, an acyloxy group such as acetoxy, an alkoxy group, an amido group, an amino group, an aminoxy group, a hydroxyl group, an oximo group, a ketoximo group, and a methylacetamido group.

Suitable organic groups for $R^2$ include, but are not limited to, monovalent organic groups such as hydrocarbon groups and halogenated hydrocarbon groups. Examples of monovalent hydrocarbon groups for $R^2$ include, but are not limited to, alkyl such as methyl, ethyl, propyl, pentyl, octyl, decyl, dodecyl, undecyl, and octadecyl; cycloalkyl such as cyclopentyl and cyclohexyl; aryl such as phenyl, tolyl, xylyl, and benzyl; and aralkyl such as 2-phenylethyl. Examples of monovalent halogenated hydrocarbon groups for $R^2$ include, but are not limited to, chlorinated alkyl groups such as chloromethyl and chloropropyl groups; fluorinated alkyl groups such as fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl; chlorinated cycloalkyl groups such as 2,2-dichlorocyclopropyl, 2,3-dichlorocyclopentyl; and fluorinated cycloalkyl groups such as 2,2-difluorocyclopropyl, 2,3-difluorocyclobutyl, 3,4-difluorocyclohexyl, and 3,4-difluoro-5-methylcycloheptyl. Examples of other monovalent organic groups for $R^2$ include, but are not limited to, hydrocarbon groups substituted with oxygen atoms such as glycidoxyalkyl, and hydrocarbon groups substituted with nitrogen atoms such as aminoalkyl and cyano-functional groups such as cyanoethyl and cyanopropyl. Alternatively, each $R^2$ may be an alkyl group such as methyl.

Ingredient (B) may comprise an α,ω-difunctional-polydiorganosiloxane when, in formula (I) above, each subscript d is 1 and each $R^3$ is an oxygen atom. For example, ingredient (B) may have formula (II): $R^1R^2_2SiO\text{-}(R^2_2SiO)_e\text{---}SiR^2_2R^1$, where $R^1$ and $R^2$ are as described above and subscript e' is an integer having a value sufficient to give the polydiorganosiloxane of formula (II) the viscosity described above. Alternatively, subscript e' may have a value ranging from 1 to 200,000, alternatively 50 to 1,000, and alternatively 200 to 700.

Alternatively, ingredient (B) may comprise a hydroxyl-functional polydiorganosiloxane of formula (II) described above, in which each $R^1$ may be a hydroxyl group, each $R^2$ may be an alkyl group such as methyl, and subscript e' may have a value such that the hydroxyl functional polydiorganosiloxane has a viscosity of at least 100 mPa·s at 25° C. Alternatively, subscript e' may have a value ranging from 50 to 700. Exemplary hydroxyl-endblocked polydiorganosiloxanes are hydroxyl-endblocked polydimethylsiloxanes. Hydroxyl-endblocked polydiorganosiloxanes suitable for use as ingredient (B) may be prepared by methods known in the art, such as hydrolysis and condensation of the corresponding organohalosilanes or equilibration of cyclic polydiorganosiloxanes.

Alternatively, ingredient (B) may comprise an alkoxysilylhydrocarbylene-endblocked polydiorganosiloxane, for example, when in formula (I) above each $R^3$ is divalent hydrocarbon group or a combination of a divalent hydrocarbon group and a divalent siloxane group. Each $R^3$ may be an alkylene group such as ethylene, propylene, or hexylene; an arylene group such as phenylene, or an alkylarylene group such as:

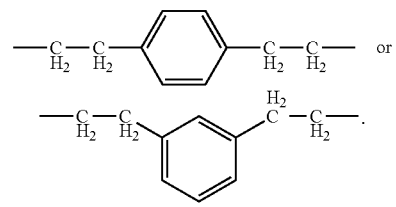

Alternatively, each $R^1$ and each $R^2$ may be alkyl, each $R^3$ may be alkylene such as ethylene, and each subscript d may be 3.

Alkoxysilylhydrocarbylene-endblocked polydiorganosiloxanes may be prepared by reacting a vinyl-terminated, polydimethylsiloxane with (alkoxysilylhydrocarbyl)tetramethyldisiloxane.

Alternatively, ingredient (B) may comprise a moisture-curable, silane-functional, organic polymer. Alternatively, the organic polymer may be a polymer in which at least half the atoms in the polymer backbone are carbon atoms with terminal moisture curable silyl groups containing hydrolyzable substituents bonded to silicon atoms. The organic polymer can, for example, be selected from hydrocarbon polymers, polyethers, acrylate polymers, polyurethanes and polyureas.

Ingredient (B) may be elastomeric, i.e., have a glass transition temperature (Tg) less than 0° C. When ingredient (B) is elastomeric, ingredient (B) may be distinguished, based on the Tg, from semi-crystalline and amorphous polyolefins (e.g., alpha-olefins), commonly referred to as thermoplastic polymers.

Ingredient (B) may comprise a silylated poly(alpha-olefin), a silylated copolymer of an iso-mono-olefin and a vinyl aromatic monomer, a silylated copolymer of a diene and a vinyl aromatic monomer, a silylated copolymer of an olefin and a diene (e.g., a silylated butyl rubber prepared from polyisobutylene and isoprene, which may optionally be halogenated), or a combination thereof (silylated copolymers), a silylated homopolymer of the iso-mono-olefin, a silylated homopolymer of the vinyl aromatic monomer, a silylated homopolymer of the diene (e.g., silylated polybutadiene or silylated hydrogenated polybutadiene), or a combination thereof (silylated homopolymers) or a combination silylated copolymers and silylated homopolymers. For purposes of this application, silylated copolymers and silylated homopolymers are referred to collectively as 'silylated polymers'. The silylated polymer may optionally contain one or more halogen groups, particularly bromine groups, covalently bonded to an atom of the silylated polymer.

Examples of suitable mono-iso-olefins include, but are not limited to, isoalkylenes such as isobutylene, isopentylene, isohexylene, and isoheptylene; alternatively isobutylene.

Examples of suitable vinyl aromatic monomers include but are not limited to alkylstyrenes such as alpha-methylstyrene, t-butylstyrene, and para-methylstyrene; alternatively para-methylstyrene. Examples of suitable alkyl groups include methyl, ethyl, n-propyl, isopropyl, n-butyl, isobutyl, and t-butyl; alternatively methyl. Examples of suitable alkenyl groups include, vinyl, allyl, propenyl, butenyl, and hexenyl; alternatively vinyl. The silylated organic polymer may have Mn ranging from 20,000 to 500,000, alternatively 50,000-200,000, alternatively 20,000 to 100,000, alternatively 25,000 to 50,000, and alternatively 28,000 to 35,000; where values of Mn are expressed in grams per mole (g/mol) and were measured by Triple Detection Size Exclusion Chromatography and calculated on the basis of polystyrene molecular weight standards.

Examples of suitable silylated poly(alpha-olefins) are known in the art and are commercially available. Examples include the condensation reaction curable silylated polymers marketed as VESTOPLAST®, which are commercially available from Degussa AG Coatings & Colorants of Marl, Germany, Europe.

Briefly stated, a method for preparing the silylated copolymers involves contacting i) an olefin copolymer having at least 50 mole % of repeat units comprising residuals of an iso-mono-olefin having 4 to 7 carbon atoms and at most 50 mole % of repeat units comprising residuals of a vinyl aromatic monomer; ii) a silane having at least two hydrolyzable groups and at least one olefinically unsaturated hydrocarbon or hydrocarbonoxy group; and iii) a free radical generating agent.

Alternatively, silylated copolymers may be prepared by a method comprising conversion of commercially available hydroxylated polybutadienes (such as those commercially available from Cray Valley SA of Paris, France, under trade names Poly BD and Krasol) by known methods (e.g., reaction with isocyanate functional alkoxysilane, reaction with allylchloride in presence of Na followed by hydrosilylation).

Alternatively, examples of suitable silyl modified hydrocarbon polymers include silyl modified polyisobutylene, which is available commercially in the form of telechelic polymers. Silyl modified polyisobutylene can, for example, contain curable silyl groups derived from a silyl-substituted alkyl acrylate or methacrylate monomer such as a dialkoxyalkylsilylpropyl methacrylate or trialkoxysilylpropyl methacrylate, which can be reacted with a polyisobutylene prepared by living anionic polymerisation, atom transfer radical polymerization or chain transfer polymerization.

Alternatively, ingredient (B) may comprise a polyether. One type of polyether is a polyoxyalkylene polymer comprising recurring oxyalkylene units of the formula (—$C_tH_{2t}$—O—) where subscript t is an integer with a value ranging from 2 to 4. Polyoxyalkylene polymers typically have terminal hydroxyl groups, and can readily be terminated with silyl groups having hydrolyzable substituents bonded to silicon atoms, for example by reaction of the terminal hydroxyl groups with an excess of an alkyltrialkoxysilane to introduce terminal alkyldialkoxysilyl groups. Alternatively, polymerization may occur via a hydrosilylation type process. Polyoxyalkylenes comprising mostly oxypropylene units may have properties suitable for many sealant uses. Polyoxyalkylene polymers, particularly polyoxypropylenes, having terminal alkyldialkoxysilyl or trialkoxysilyl groups may react with each other in the presence of ingredient (A) and moisture. The composition containing these base polymers may optionally further comprise a crosslinker.

The organic polymer having hydrolysable silyl groups can alternatively be an acrylate polymer, that is an addition polymer of acrylate and/or methacrylate ester monomers, which may comprise at least 50 mole % of the monomer repeat units in the acrylate polymer. Examples of suitable acrylate ester monomers are n-butyl, isobutyl, n-propyl, ethyl, methyl, n-hexyl, n-octyl and 2-ethylhexyl acrylates. Examples of suitable methacrylate ester monomers are n-butyl, isobutyl, methyl, n-hexyl, n-octyl, 2-ethylhexyl and lauryl methacrylates. For some applications, the acrylate polymer may have a Tg below ambient temperature; and acrylate polymers may form lower Tg polymers than methacrylate polymers. An exemplary acrylate polymer is polybutyl acrylate. The acrylate polymer may contain lesser amounts of other monomers such as styrene, acrylonitrile or acrylamide. The acrylate polymer can be prepared by various methods such as conventional radical polymerization, or living radical polymerization such as atom transfer radical polymerization, reversible addition-fragmentation chain transfer polymerization, or anionic polymerization including living anionic polymerization. The curable silyl groups can, for example, be derived from a silyl-substituted alkyl acrylate or methacrylate monomer. Hydrolysable silyl groups such as dialkoxyalkylsilyl or trialkoxysilyl groups can, for example, be derived from a dialkoxyalkylsilylpropyl methacrylate or trialkoxysilylpropyl methacrylate. When the acrylate polymer has been prepared by a polymerization process which forms reactive terminal groups, such as atom transfer radical polymerization, chain transfer polymerization, or living anionic polymerization, it can readily be reacted with the silyl-substituted alkyl acrylate or methacrylate monomer to form terminal hydrolyzable silyl groups.

Silyl modified polyurethanes or polyureas can, for example, be prepared by the reaction of polyurethanes or polyureas having terminal ethylenically unsaturated groups with a silyl monomer containing hydrolyzable groups and a Si—H group, for example a dialkoxyalkylsilicon hydride or trialkoxysilicon hydride.

Alternatively, the base polymer may have a silicone-organic block copolymer backbone, which comprises at least one block of polyorganosiloxane groups and at least one block of an organic polymer chain. The polyorganosiloxane groups may comprise groups of formula —$(R^4_f SiO_{(4-f)/2})$—, in which each $R^4$ is independently an organic group such as a hydrocarbon group having from 1 to 18 carbon atoms, a halogenated hydrocarbon group having from 1 to 18 carbon atoms such as chloromethyl, perfluorobutyl, trifluoroethyl, and nonafluorohexyl, a hydrocarbonoxy group having up to 18 carbon atoms, or another organic group exemplified by an oxygen atom containing group such as (meth)acrylic or carboxyl; a nitrogen atom containing group such as amino-functional groups, amido-functional groups, and cyano-functional groups; a sulfur atom containing group such as mercapto groups; and subscript f has, on average, a value ranging from 1 to 3, alternatively 1.8 to 2.2.

Alternatively, each $R^4$ may be a hydrocarbon group having 1 to 10 carbon atoms or a halogenated hydrocarbon group; and subscript f may be 0, 1 or 2. Examples of groups suitable for $R^4$ include methyl, ethyl, propyl, butyl, vinyl, cyclohexyl, phenyl, tolyl group, a propyl group substituted with chlorine or fluorine such as 3,3,3-trifluoropropyl, chlorophenyl, beta-(perfluorobutyl)ethyl or chlorocyclohexyl group.

The organic blocks in the polymer backbone may comprise, for example, polystyrene and/or substituted polystyrenes such as poly(α-methylstyrene), poly(vinylmethylstyrene), dienes, poly(p-trimethylsilylstyrene) and poly(p-trimethylsilyl-α-methylstyrene). Other organic groups, which may be incorporated in the polymer backbone, may include acetylene terminated oligophenylenes, vinylbenzyl terminated aromatic polysulphones oligomers, aromatic polyesters, aromatic polyester based monomers, polyalkylenes, polyurethanes, aliphatic polyesters, aliphatic polyamides and aromatic polyamides.

Alternatively, the organic polymer blocks in a siloxane organic block copolymer for ingredient (B) may be polyoxyalkylene based blocks comprising recurring oxyalkylene units, illustrated by the average formula $(-C_gH_{2g}-O-)_h$ where subscript g is an integer with a value ranging from 2 to 4 and subscript h is an integer of at least four. The number average molecular weight (Mn) of each polyoxyalkylene polymer block may range from 300 to 10,000. Moreover, the oxyalkylene units are not necessarily identical throughout the polyoxyalkylene block, but can differ from unit to unit. A polyoxyalkylene block, for example, can comprise oxyethylene units ($-C_2H_4-O-$), oxypropylene units ($-C_3H_6-O-$) or oxybutylene units ($-C_4H_8-O-$), or combinations thereof. Alternatively, the polyoxyalkylene polymeric backbone may consist essentially of oxyethylene units and/or oxypropylene units. Other polyoxyalkylene blocks may include for example, units of the structure: $-[-R^5-O-(-R^6-O-)_i-Pn-CR^7_2-Pn-O-(-R^6-O-)_j-R^5]-$, in which Pn is a 1,4-phenylene group, each $R^5$ is the same or different and is a divalent hydrocarbon group having 2 to 8 carbon atoms, each $R^6$ is the same or different and is an ethylene group or propylene group, each $R^7$ is the same or different and is a hydrogen atom or methyl group and each of the subscripts i and j each represent a positive integer having a value ranging from 3 to 30.

Alternatively, ingredient (B) may comprise a silicone resin, in addition to, or instead of, one of the polymers described above for ingredient (B). Suitable silicone resins are exemplified by an MQ resin, which comprises siloxane units of the formulae: $R^{29}_wR^{30}_{(3-w)}SiO_{1/2}$ and $SiO_{4/2}$, where $R^{29}$ and $R^{30}$ are monovalent organic groups, such as monovalent hydrocarbon groups exemplified by alkyl such as methyl, ethyl, propyl, pentyl, octyl, decyl, dodecyl, undecyl, and octadecyl; cycloalkyl such as cyclopentyl and cyclohexyl; aryl such as phenyl, tolyl, xylyl, and benzyl; and aralkyl such as 2-phenylethyl; halogenated hydrocarbon group exemplified by chlorinated alkyl groups such as chloromethyl and chloropropyl groups; fluorinated alkyl groups such as fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl; chlorinated cycloalkyl groups such as 2,2-dichlorocyclopropyl, 2,3-dichlorocyclopentyl; and fluorinated cycloalkyl groups such as 2,2-difluorocyclopropyl, 2,3-difluorocyclobutyl, 3,4-difluorocyclohexyl, and 3,4-difluoro-5-methylcycloheptyl; and other monovalent organic groups such as hydrocarbon groups substituted with oxygen atoms such as glycidoxyalkyl, and hydrocarbon groups substituted with nitrogen atoms such as aminoalkyl and cyano-functional groups such as cyanoethyl and cyanopropyl; and each instance of subscript w is 0, 1, or 2. Alternatively, each $R^{29}$ and each $R^{30}$ may be an alkyl group. The MQ resin may have a molar ratio of M units to Q units (M:Q) ranging from 0.5:1 to 1.5:1. These mole ratios are conveniently measured by $Si^{29}NMR$ spectroscopy. This technique is capable of quantitatively determining the concentration of $R^{29}_3SiO_{1/2}$ ("M") and $SiO_{4/2}$ ("Q") units derived from the silicone resin and from the neopentamer, $Si(OSiMe_3)_4$, present in the initial silicone resin, in addition to the total hydroxyl content of the silicone resin.

The MQ silicone resin is soluble in solvents such as liquid hydrocarbons exemplified by benzene, toluene, xylene, and heptane, or in liquid organosilicon compounds such as a low viscosity cyclic and linear polydiorganosiloxanes.

The MQ silicone resin may contain 2.0% or less, alternatively 0.7% or less, alternatively 0.3% or less, of terminal units represented by the formula $X''SiO_{3/2}$, where X'' represents hydroxyl or a hydrolyzable group such as alkoxy such as methoxy and ethoxy; alkenyloxy such as isopropenyloxy; ketoximo such as methyethylketoximo; carboxy such as acetoxy; amidoxy such as acetamidoxy; and aminoxy such as N,N-dimethylaminoxy. The concentration of silanol groups present in the silicone resin can be determined using FTIR.

The Mn desired to achieve the desired flow characteristics of the MQ silicone resin can depend at least in part on the Mn of the silicone resin and the type of organic group, represented by $R^{29}$, that are present in this ingredient. The Mn of the MQ silicone resin is typically greater than 3,000, more typically from 4500 to 7500.

The MQ silicone resin can be prepared by any suitable method. Silicone resins of this type have reportedly been prepared by cohydrolysis of the corresponding silanes or by silica hydrosol capping methods known in the art. Briefly stated, the method involves reacting a silica hydrosol under acidic conditions with a hydrolyzable triorganosilane such as trimethylchlorosilane, a siloxane such as hexamethyldisiloxane, or a combination thereof, and recovering a product comprising M and Q units (MQ resin). The resulting MQ resins may contain from 2 to 5 percent by weight of silicon-bonded hydroxyl groups.

The intermediates used to prepare the MQ silicone resin may be triorganosilanes of the formula $R^{29}_3SiX$, where X represents a hydrolyzable group, as described above for ingredient (B), and either a silane with four hydrolyzable groups such as halogen, alkoxy or hydroxyl, or an alkali metal silicate such as sodium silicate.

In some compositions, it may be desirable that the amount of silicon-bonded hydroxyl groups (i.e., $HOR^{29}SiO_{1/2}$ or $HOSiO_{3/2}$ groups) in the silicone resin be below 0.7% by weight of the total weight of the silicone resin, alternatively below 0.3%. Silicon-bonded hydroxyl groups formed during preparation of the silicone resin are converted to trihydrocarbylsiloxy groups or a hydrolyzable group by reacting the silicone resin with a silane, disiloxane or disilazane containing the appropriate terminal group. Silanes containing hydrolyzable groups may be added in excess of the stoichiometric quantity of the silicon-bonded hydroxyl groups of the silicone resin.

Various suitable MQ resins are commercially available from sources such as Dow Corning Corporation of Midland, Mich., U.S.A., Momentive Performance Materials of Albany, N.Y., U.S.A., and Bluestar Silicones USA Corp. of East Brunswick, N.J., U.S.A. For example, DOW CORNING® MQ-1600 Solid Resin, DOW CORNING® MQ-1601 Solid Resin, and DOW CORNING® 1250 Surfactant, DOW CORNING® 7466 Resin, and DOW CORNING® 7366 Resin, all of which are commercially available from Dow Corning Corporation, are suitable for use in the methods described herein. Alternatively, a resin containing M, T, and Q units may be used, such as DOW CORNING® MQ-1640 Flake Resin, which is also commercially available from Dow Corning Corporation. Such resins may be supplied in organic solvent.

Alternatively, the silicone resin may comprise a silsesquioxane resin, i.e., a resin containing T units of formula $(R^{31}SiO_{3/2})$. Each $R^{31}$ may be independently selected from a hydrogen atom and a monovalent organic group, such as a monovalent hydrocarbon group exemplified by alkyl such as methyl, ethyl, propyl, pentyl, octyl, decyl, dodecyl, undecyl, and octadecyl; cycloalkyl such as cyclopentyl and cyclohexyl; aryl such as phenyl, tolyl, xylyl, and benzyl; and aralkyl such as 2-phenylethyl; halogenated hydrocarbon group exemplified by chlorinated alkyl groups such as chloromethyl and chloropropyl groups; a fluorinated alkyl group such as fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl; chlorinated cycloalkyl groups such as 2,2-dichlorocyclopropyl, 2,3-dichlorocyclopentyl; and fluorinated cycloalkyl groups such as 2,2-difluorocyclopropyl, 2,3-difluorocyclobutyl, 3,4-difluorocyclohexyl, and 3,4-difluoro-5-methylcycloheptyl; and another monovalent organic group such as a hydrocarbon group substituted with oxygen atoms such as glycidoxyalkyl, and a hydrocarbon group substituted with a nitrogen atom such as aminoalkyl and cyano-functional groups such as cyanoethyl and cyanopropyl. Silsesquioxane resins suitable for use herein are known in the art and are commercially available. For example, a methylmethoxysiloxane methylsilsesquioxane resin having a DP of 15 and a weight average molecular weight (Mw) of 1200 g/mol is commercially available as DOW CORNING® US-CF 2403 Resin from Dow Corning Corporation of Midland, Mich., U.S.A. Alternatively, the silsesquioxane resin may have phenylsilsesquioxane units, methylsilsesquioxane units, or a combination thereof. Such resins are known in the art and are commercially available as DOW CORNING® 200 Flake resins, also available from Dow Corning Corporation. Alternatively, the silicone resin may comprise D units of formulae $(R^{31}_2SiO_{2/2})$ and/or $(R^{31}R^{32}SiO_{2/2})$ and T units of formulae $(R^{31}SiO_{3/2})$ and/or $(R^{32}SiO_{3/2})$, i.e., a DT resin, where $R^{31}$ is as described above and $R^{32}$ is a hydrolyzable group such as group X described above. DT resins are known in the art and are commercially available, for example, methoxy functional DT resins include DOW CORNING® 3074 and DOW CORNING® 3037 resins; and silanol functional resins include DOW CORNING® 800 Series resins, which are also commercially available from Dow Corning Corporation. Other suitable resins include DT resins containing methyl and phenyl groups.

The amount of silicone resin added to the composition can vary depending on the end use of the composition. For example, when the reaction product of the composition is a gel, little or no silicone resin may be added. However, the amount of silicone resin in the composition may range from 0% to 90%, alternatively 0.1% to 50%, based on the weight of all ingredients in the composition.

The amount of ingredient (B) can depend on various factors including the end use of the reaction product of the composition, the type of base polymer selected for ingredient (B), and the type(s) and amount(s) of any additional ingredient(s) present, if any. However, the amount of ingredient (B) may range from 0.01% to 99%, alternatively 10% to 95%, alternatively 10% to 65% of the composition.

Ingredient (B) can be one single base polymer or a combination comprising two or more base polymers that differ in at least one of the following properties: average molecular weight, hydrolyzable substituents, siloxane units, sequence, and viscosity. When one base polymer for ingredient (B) contains an average of only one to two hydrolyzable substituents per molecule, then the composition further may further comprise an additional base polymer having an average of more than two hydrolyzable substituents per molecule, or ingredient (C) a crosslinker, or both.

The composition may optionally further comprise one or more additional ingredients, i.e., in addition to ingredients (A) and (B) and distinct from ingredients (A) and (B). The additional ingredient, if present, may be selected based on factors such as the method of use of the composition and/or the end use of the cured product of the composition. The additional ingredient may be: (C) a crosslinker; (D) a drying agent; (E) an extender, a plasticizer, or a combination thereof; (F) a filler such as (f1) a reinforcing filler, (f2) an extending filler, (f3) a conductive filler (e.g., electrically conductive, thermally conductive, or both); (G) a filler treating agent; (H) a biocide, such as (h1) a fungicide, (h2) an herbicide, (h3) a pesticide, or (h4) an antimicrobial; (J) a flame retardant; (K) a surface modifier such as (k1) an adhesion promoter or (k2) a release agent; (L) a chain lengthener; (M) an endblocker; (N) a nonreactive binder; (O) an anti-aging additive; (P) a water release agent; (Q) a pigment; (R) a rheological additive; (S) a vehicle; (T) a tackifying agent; (U) a corrosion inhibitor; and a combination thereof. The additional ingredients are distinct from one another. In some embodiments at least one, alternatively each of additional ingredients (C) to (U), and the combination thereof, does not completely prevent the condensation reaction of ingredient (B).

Ingredient (C) is a crosslinker that may be added to the composition, for example, when ingredient (B) contains an average of only one or two hydrolyzable substituents per molecule and/or to increase crosslink density of the reaction product prepared by condensation reaction of the composition. Generally, ingredient (C) is selected with functionality that can vary depending on the degree of crosslinking desired in the reaction product of the composition and such that the reaction product does not exhibit too much weight loss from by-products of the condensation reaction. Generally, the selection of ingredient (C) is made such that the composition remains sufficiently reactable to be useful during storage for several months in a moisture impermeable package. Generally, ingredient (C) is selected such that the hydrolyzable substituents on ingredient (C) are reactive with ingredient (B). For example, when X in ingredient (B) is a hydroxyl group, then the hydrolyzable substituent for ingredient (C) may be a hydrogen atom, a halogen atom; an amido group, an acyloxy groups, a hydrocarbonoxy group, an amino group, an aminoxy group, a mercapto group, an oximo group, a ketoximo group, or an alkoxysilylhydrocarbylene group, or a combination thereof. The exact amount of ingredient (C) can vary depending on factors including the type of base polymer and crosslinker selected, the reactivity of the hydrolyzable substituents on the base polymer and crosslinker, and the desired crosslink density of the reaction product. However, the amount of crosslinker may range from 0.5 to 100 parts based on 100 parts by weight of ingredient (B).

Ingredient (C) may comprise a silane crosslinker having hydrolyzable groups or partial or full hydrolysis products thereof. Ingredient (C) has an average, per molecule, of greater than two substituents reactive with the hydrolyzable substituents on ingredient (B). Examples of suitable silane crosslinkers for ingredient (C) may have the general formula (III) $R^8_k Si(R^9)_{(4-k)}$, where each $R^8$ is independently a monovalent hydrocarbon group such as an alkyl group; each $R^9$ is a hydrolyzable substituent, which may be the same as X described above for ingredient (B). Alternatively, each $R^9$ may be, for example, a hydrogen atom, a halogen atom, an acetamido group, an acyloxy group such as acetoxy, an alkoxy group, an amido group, an amino group, an aminoxy group, a hydroxyl group, an oximo group, a ketoximo group, or a methylacetamido group; and each instance of subscript k may be 0, 1, 2, or 3. For ingredient (C), subscript k has an average value greater than 2. Alternatively, subscript k may have a value ranging from 3 to 4. Alternatively, each $R^9$ may be independently selected from hydroxyl, alkoxy, acetoxy, amide, or oxime. Alternatively, ingredient (C) may be selected from an acyloxysilane, an alkoxysilane, a ketoximosilane, and an oximosilane.

Ingredient (C) may comprise an alkoxysilane exemplified by a dialkoxysilane, such as a dialkyldialkoxysilane; a trialkoxysilane, such as an alkyltrialkoxysilane; a tetraalkoxysilane; or partial or full hydrolysis products thereof, or another combination thereof. Examples of suitable trialkoxysilanes include methyltrimethoxysilane, methyltriethoxysilane, ethyltrimethoxysilane, ethyltriethoxysilane, isobutyltrimethoxysilane, isobutyltriethoxysilane, and a combination thereof, and alternatively methyltrimethoxysilane. Examples of suitable tetraalkoxysilanes include tetraethoxysilane. The amount of the alkoxysilane that is used in the curable silicone composition may range from 0.5 to 15, parts by weight per 100 parts by weight of ingredient (B).

Ingredient (C) may comprise an acyloxysilane, such as an acetoxysilane. Acetoxysilanes include a tetraacetoxysilane, an organotriacetoxysilane, a diorganodiacetoxysilane, or a combination thereof. The acetoxysilane may contain alkyl groups such as methyl, ethyl, propyl, isopropyl, butyl, and tertiary butyl; alkenyl groups such as vinyl, allyl, or hexenyl; aryl groups such as phenyl, tolyl, or xylyl; aralkyl groups such as benzyl or 2-phenylethyl; and fluorinated alkyl groups such as 3,3,3-trifluoropropyl. Exemplary acetoxysilanes include, but are not limited to, tetraacetoxysilane, methyltriacetoxysilane, ethyltriacetoxysilane, vinyltriacetoxysilane, propyltriacetoxysilane, butyltriacetoxysilane, phenyltriacetoxysilane, octyltriacetoxysilane, dimethyldiacetoxysilane, phenylmethyldiacetoxysilane, vinylmethyldiacetoxysilane, diphenyl diacetoxysilane, tetraacetoxysilane, and combinations thereof. Alternatively, ingredient (C) may comprise organotriacetoxysilanes, for example mixtures comprising methyltriacetoxysilane and ethyltriacetoxysilane. The amount of the acetoxysilane that is used in the curable silicone composition may range from 0.5 to 15 parts by weight per 100 parts by weight of ingredient (B); alternatively 3 to 10 parts by weight of acetoxysilane per 100 parts by weight of ingredient (B).

Examples of silanes suitable for ingredient (C) containing both alkoxy and acetoxy groups that may be used in the composition include methyldiacetoxymethoxysilane, methylacetoxydimethoxysilane, vinyldiacetoxymethoxysilane, vinylacetoxydimethoxysilane, methyldiacetoxyethoxysilane, metylacetoxydiethoxysilane, and combinations thereof.

Aminofunctional alkoxysilanes suitable for ingredient (C) are exemplified by $H_2N(CH_2)_2Si(OCH_3)_3$, $H_2N(CH_2)_2Si(OCH_2CH_3)_3$, $H_2N(CH_2)_3Si(OCH_3)_3$, $H_2N(CH_2)_3Si(OCH_2CH_3)_3$, $CH_3NH(CH_2)_3Si(OCH_3)_3$, $CH_3NH(CH_2)_3Si(OCH_2CH_3)_3$, $CH_3NH(CH_2)_5Si(OCH_3)_3$, $CH_3NH(CH_2)_5Si(OCH_2CH_3)_3$, $H_2N(CH_2)_2NH(CH_2)_3Si(OCH_3)_3$, $H_2N(CH_2)_2NH(CH_2)_3Si(OCH_2CH_3)_3$, $CH_3NH(CH_2)_2NH(CH_2)_3Si(OCH_3)_3$, $CH_3NH(CH_2)_2NH(CH_2)_3Si(OCH_2CH_3)_3$, $C_4H_9NH(CH_2)_2NH(CH_2)_3Si(OCH_3)_3$, $C_4H_9NH(CH_2)_2NH(CH_2)_3Si(OCH_2CH_3)_3$, $H_2N(CH_2)_2SiCH_3(OCH_3)_2$, $H_2N(CH_2)_2SiCH_3(OCH_2CH_3)_2$, $H_2N(CH_2)_3SiCH_3(OCH_3)_2$, $H_2N(CH_2)_3SiCH_3(OCH_2CH_3)_2$, $CH_3NH(CH_2)_3SiCH_3(OCH_3)_2$, $CH_3NH(CH_2)_3SiCH_3(OCH_2CH_3)_2$, $CH_3NH(CH_2)_5SiCH_3(OCH_3)_2$, $CH_3NH(CH_2)_5SiCH_3(OCH_2CH_3)_2$, $H_2N(CH_2)_2NH(CH_2)_3SiCH_3(OCH_3)_2$, $H_2N(CH_2)_2NH(CH_2)_3SiCH_3(OCH_2CH_3)_2$, $CH_3NH(CH_2)_2NH(CH_2)_3SiCH_3(OCH_3)_2$, $CH_3NH(CH_2)_2NH(CH_2)_3SiCH_3(OCH_2CH_3)_2$, $C_4H_9NH(CH_2)_2NH(CH_2)_3SiCH_3(OCH_3)_2$, $C_4H_9NH(CH_2)_2NH(CH_2)_3SiCH_3(OCH_2CH_3)_2$, and a combination thereof.

Suitable oximosilanes for ingredient (C) include alkyltrioximosilanes such as methyltrioximosilane, ethyltrioximosilane, propyltrioximosilane, and butyltrioximosilane; alkoxytrioximosilanes such as methoxytrioximosilane, ethoxytrioximosilane, and propoxytrioximosilane; or alkenyltrioximosilanes such as propenyltrioximosilane and butenyltrioximosilane; alkenyloximosilanes such as vinyloximosilane; alkenylalkyldioximosilanes such as vinyl methyl dioximosilane, vinyl ethyldioximosilane, vinyl methyldioximosilane, or vinylethyldioximosilane; or combinations thereof.

Suitable ketoximosilanes for ingredient (C) include methyl tris(dimethylketoximo)silane, methyl tris(methylethylketoximo)silane, methyl tris(methylpropylketoximo)silane, methyl tris(methylisobutylketoximo)silane, ethyl tris(dimethylketoximo)silane, ethyl tris(methylethylketoximo)silane, ethyl tris(methylpropylketoximo)silane, ethyl tris(methylisobutylketoximo)silane, vinyl tris(dimethylketoximo)silane, vinyl tris(methylethylketoximo)silane, vinyl tris(methylpropylketoximo)silane, vinyl tris(methylisobutylketoximo)silane, tetrakis(dimethylketoximo)silane, tetrakis(methylethylketoximo)silane, tetrakis(methylpropylketoximo)silane, tetrakis(methylisobutylketoximo)silane, methylbis(dimethylketoximo)silane, methylbis(cyclohexylketoximo)silane, triethoxy(ethylmethylketoxime)silane, diethoxydi(ethylmethylketoxime)silane, ethoxytri(ethylmethylketoxime)silane, methylvinylbis(methylisobutylketoximo)silane, or a combination thereof.

Alternatively, ingredient (C) may be polymeric. For example, ingredient (C) may comprise a disilane such as bis(triethoxysilyl)hexane), 1,4-bis[trimethoxysilyl(ethyl)]benzene, and bis[3-(triethoxysilyl)propyl]tetrasulfide Ingredient (C) can be one single crosslinker or a combination comprising two or more crosslinkers that differ in at least one of the following properties: hydrolyzable substituents and other organic groups bonded to silicon, and when a polymeric crosslinker is used, siloxane units, structure, molecular weight, and sequence.

Ingredient (D) is a drying agent. The drying agent binds water from various sources. For example, the drying agent may bind by-products of the condensation reaction, such as water and alcohols.

Examples of suitable adsorbents for ingredient (D) may be inorganic particulates. The adsorbent may have a particle size of 10 micrometers or less, alternatively 5 micrometers or less. The adsorbent may have average pore size sufficient to adsorb water and alcohols, for example 10 Å (Angstroms) or less, alternatively 5 Å or less, and alternatively 3 Å or less. Examples of adsorbents include zeolites such as chabasite, mordenite, and analcite; molecular sieves such as alkali metal alumino silicates, silica gel, silica-magnesia gel, activated carbon, activated alumina, calcium oxide, and combinations thereof.

Examples of commercially available drying agents include dry molecular sieves, such as 3 Å (Angstrom) molecular sieves, which are commercially available from Grace Davidson under the trademark SYLOSIV® and from Zeochem of Louisville, Ky., U.S.A. under the trade name PURMOL, and 4 Å molecular sieves such as Doucil zeolite 4A available from Ineos Silicas of Warrington, England. Other useful molecular sieves include MOLSIV ADSORBENT TYPE 13X, 3A, 4A, and 5A, all of which are commercially available from UOP of Illinois, U.S.A.; SILIPORITE NK 30AP and 65xP from Atofina of Philadelphia, Pa., U.S.A.; and molecular sieves available from W.R. Grace of Maryland, U.S.A.

Alternatively, the drying agent may bind the water and/or other by-products by chemical means. An amount of a silane crosslinker added to the composition (in addition to ingredient (C)) may function as a chemical drying agent. Without wishing to be bound by theory, it is thought that the chemical drying agent may be added to the dry part of a multiple part composition to keep the composition free from water after the parts of the composition are mixed together. For example, alkoxysilanes suitable as drying agents include vinyltrimethoxysilane, vinyltriethoxysilane, and combinations thereof.

The amount of ingredient (D) depends on the specific drying agent selected. However, when ingredient (D) is a chemical drying agent, the amount may range from 0 parts to 5 parts, alternatively 0.1 parts to 0.5 parts. Ingredient (D) may be one chemical drying agent. Alternatively, ingredient (D) may comprise two or more different chemical drying agents.

Ingredient (E) is an extender and/or a plasticizer. An extender comprising a non-functional polyorganosiloxane may be used in the composition. For example, the non-functional polyorganosiloxane may comprise difunctional units of the formula $R^{22}_2SiO_{2/2}$ and terminal units of the formula $R^{23}_3SiD'-$, where each $R^{22}$ and each $R^{23}$ are independently a monovalent organic group such as a monovalent hydrocarbon group exemplified by alkyl such as methyl, ethyl, propyl, and butyl; alkenyl such as vinyl, allyl, and hexenyl; aryl such as phenyl, tolyl, xylyl, and naphthyl; and aralkyl groups such as phenylethyl; and D' is an oxygen atom or a divalent group linking the silicon atom of the terminal unit with another silicon atom (such as group D described above for ingredient (B)), alternatively D' is an oxygen atom. Non-functional polyorganosiloxanes are known in the art and are commercially available. Suitable non-functional polyorganosiloxanes are exemplified by, but not limited to, polydimethylsiloxanes. Such polydimethylsiloxanes include DOW CORNING® 200 Fluids, which are commercially available from Dow Corning Corporation of Midland, Mich., U.S.A. and may have viscosity ranging from 50 cSt to 100,000 cSt, alternatively 50 cSt to 50,000 cSt, and alternatively 12,500 to 60,000 cSt.

An organic plasticizer may be used in addition to, or instead of, the non-functional polyorganosiloxane extender described above. Organic plasticizers are known in the art and are commercially available. The organic plasticizer may comprise a phthalate, a carboxylate, a carboxylic acid ester, an adipate or a combination thereof. The organic plasticizer may be selected from the group consisting of: bis(2-ethylhexyl) terephthalate; bis(2-ethylhexyl)-1,4-benzenedicarboxylate; 2-ethylhexyl methyl-1,4-benzenedicarboxylate; 1,2 cyclohexanedicarboxylic acid, dinonyl ester, branched and linear; bis(2-propylheptyl) phthalate; diisononyl adipate; and a combination thereof.

The organic plasticizer may have an average, per molecule, of at least one group of formula

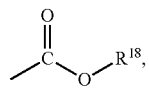

where $R^{18}$ represents a hydrogen atom or a monovalent organic group. Alternatively, $R^{18}$ may represent a branched or linear monovalent hydrocarbon group. The monovalent organic group may be a branched or linear monovalent hydrocarbon group such as an alkyl group of 4 to 15 carbon atoms, alternatively 9 to 12 carbon atoms. Suitable plasticizers may be selected from the group consisting of adipates, carboxylates, phthalates, and a combination thereof.

Alternatively, the organic plasticizer may have an average, per molecule, of at least two groups of the formula above bonded to carbon atoms in a cyclic hydrocarbon. The organic plasticizer may have general formula:

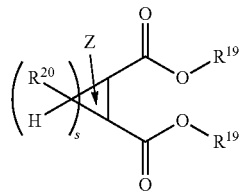

In this formula, group Z represents a carbocyclic group having 3 or more carbon atoms, alternatively 3 to 15 carbon atoms. Subscript s may have a value ranging from 1 to 12. Group Z may be saturated or aromatic. Each $R^{20}$ is independently a hydrogen atom or a branched or linear monovalent organic group. The monovalent organic group for $R^{19}$ may be an alkyl group such as methyl, ethyl, or butyl. Alternatively, the monovalent organic group for $R^{20}$ may be an ester functional group. Each $R^{19}$ is independently a branched or linear monovalent hydrocarbon group, such as an alkyl group of 4 to 15 carbon atoms.

Suitable organic plasticizers are known in the art and are commercially available. The plasticizer may comprise a phthalate, such as: a dialkyl phthalate such as dibutyl phthalate (Eastman™ DBP Plasticizer), diheptyl phthalate, di(2-ethylhexyl) phthalate, or diisodecyl phthalate (DIDP), bis(2-propylheptyl) phthalate (BASF Palatinol® DPHP), di(2-ethylhexyl) phthalate (Eastman™ DOP Plasticizer), dimethyl phthalate (Eastman™ DMP Plasticizer); diethyl phthalate (Eastman™ DMP Plasticizer); butyl benzyl phthalate, and bis(2-ethylhexyl) terephthalate (Eastman™ 425 Plasticizer); a dicarboxylate such as Benzyl, C7-C9 linear and branched alkyl esters, 1,2, benzene dicarboxylic acid (Ferro SANTICIZER® 261A), 1,2,4-benzenetricarboxylic acid (BASF Palatinol® TOTM-I), bis(2-ethylhexyl)-1,4-benzenedicarboxylate (Eastman™ 168 Plasticizer); 2-ethylhexyl methyl-1,4-benzenedicarboxylate; 1,2 cyclohexanedicarboxylic acid, dinonyl ester, branched and linear (BASF Hexamoll *DINCH); diisononyl adipate; trimellitates such as trioctyl trimellitate (Eastman™ TOTM Plasticizer); triethylene glycol bis(2-ethylhexanoate) (Eastman™ TEG-EH Plasticizer); triacetin (Eastman™ Triacetin); nonaromatic dibasic acid esters such as dioctyl adipate, bis(2-ethylhexyl) adipate (Eastman™ DOA Plasticizer and Eastman™ DOA Plasticizer, Kosher), di-2-ethylhexyladipate (BASF Plastomoll® DOA), dioctyl sebacate, dibutyl sebacate and diisodecyl succinate; aliphatic esters such as butyl oleate and methyl acetyl recinolate; phosphates such as tricresyl phosphate and tributyl phosphate; chlorinated paraffins; hydrocarbon oils such as alkyldiphenyls and partially hydrogenated terphenyls; process oils; epoxy plasticizers such as epoxidized soybean oil and benzyl epoxystearate; tris(2-ethylhexyl) ester; a fatty acid ester; and a combination thereof. Examples of other suitable plasticizers and their commercial sources include BASF Palamoll® 652 and Eastman 168 Xtreme™ Plasticizer.

Alternatively, a polymer plasticizer can be used. Examples of the polymer plasticizer include alkenyl polymers obtained by polymerizing vinyl or allyl monomers by means of various methods; polyalkylene glycol esters such as diethylene glycol dibenzoate, triethylene glycol dibenzoate and pentaerythritol ester; polyester plasticizers obtained from dibasic acids such as sebacic acid, adipic acid, azelaic acid and phthalic acid and dihydric alcohols such as ethylene glycol, diethylene glycol, triethylene glycol, propylene glycol and dipropylene glycol; polyethers including polyether polyols each having a molecular weight of not less than 500 such as polyethylene glycol, polypropylene glycol and polytetramethylene glycol, polystyrenes such as polystyrene and poly-alpha-methylstyrene; and polybutadiene, polybutene, polyisobutylene, butadiene acrylonitrile, and polychloroprene.

When the organic plasticizer is present, the amount of the organic plasticizer may range from 5 to 150 parts by weight based on the combined weights of all ingredients in the composition.

The polyorganosiloxane extenders and organic plasticizers described above for ingredient (E) may be used either each alone or in combinations of two or more thereof. A low molecular weight organic plasticizer and a higher molecular weight polymer plasticizer may be used in combination. The exact amount of ingredient (E) used in the composition can depend on various factors including the desired end use of the composition and the cured product thereof. However, the amount of ingredient (E) may range from 0.1% to 10 based on the combined weights of all ingredients in the composition.

Ingredient (F) is a filler. The filler may comprise a reinforcing filler, an extending filler, a conductive filler, or a combination thereof. For example, the composition may optionally further comprise ingredient (f1), a reinforcing filler, which when present may be added in an amount ranging from 0.1% to 95%, alternatively 1% to 60%, based on the weight of the composition. The exact amount of ingredient (f1) depends on various factors including the form of the reaction product of the composition and whether any other fillers are added. Examples of suitable reinforcing fillers include reinforcing silica fillers such as fume silica, silica aerogel, silica xerogel, and precipitated silica. Fumed silicas are known in the art and commercially available; e.g., fumed silica sold under the name CAB-O-SIL by Cabot Corporation of Massachusetts, U.S.A.

The composition may optionally further comprise ingredient (f2) an extending filler in an amount ranging from 0.1% to 95%, alternatively 1% to 60%, and alternatively 1% to 20%, based on the weight of the composition. Examples of extending fillers include crushed quartz, aluminum oxide, magnesium oxide, calcium carbonate such as precipitated calcium carbonate, zinc oxide, talc, diatomaceous earth, iron oxide, clays, mica, chalk, titanium dioxide, zirconia, sand, carbon black, graphite, or a combination thereof. Extending fillers are known in the art and commercially available; such as a ground silica sold under the name MIN-U-SIL by U.S. Silica of Berkeley Springs, W. Va. Suitable precipitated calcium carbonates included Winnofil® SPM from Solvay and Ultrapflex® and Ultrapflex® 100 from SMI.

The composition may optionally further comprise ingredient (f3) a conductive filler. Conductive fillers may be thermally conductive, electrically conductive, or both. Conductive fillers are known in the art and are exemplified by metal particulates (such as aluminum, copper, gold, nickel, silver, and combinations thereof); such metals coated on nonconductive substrates; metal oxides (such as aluminum oxide, beryllium oxide, magnesium oxide, zinc oxide, and combinations thereof), meltable fillers (e.g., solder), aluminum nitride, aluminum trihydrate, barium titanate, boron nitride, carbon fibers, diamond, graphite, magnesium hydroxide, onyx, silicon carbide, tungsten carbide, and a combination thereof.

Alternatively, other fillers may be added to the composition, the type and amount depending on factors including the end use of the cured product of the composition. Examples of such other fillers include magnetic particles such as ferrite; and dielectric particles such as fused glass microspheres, titania, and calcium carbonate.

The composition may optionally further comprise ingredient (G) a treating agent. The amount of ingredient (G) can vary depending on factors such as the type of treating agent selected and the type and amount of particulates to be treated, and whether the particulates are treated before being added to the composition, or whether the particulates are treated in situ. However, ingredient (G) may be used in an amount ranging from 0.01 to 20%, alternatively 0.1% to 15%, and alternatively 0.5% to 5%, based on the weight of the composition. Particulates, such as the filler, the physical drying agent, certain flame retardants, certain pigments, and/or certain water release agents, when present, may optionally be surface treated with ingredient (G). Particulates may be treated with ingredient (G) before being added to the composition, or in situ. Ingredient (G) may comprise an alkoxysilane, an alkoxy-functional oligosiloxane, a cyclic polyorganosiloxane, a hydroxyl-functional oligosiloxane such as a dimethyl siloxane or methyl phenyl siloxane, or a fatty acid. Examples of fatty acids include stearates such as calcium stearate.

Some representative organosilicon filler treating agents that can be used as ingredient (G) include compositions normally used to treat silica fillers such as organochlorosilanes, organosiloxanes, organodisilazanes such as hexaalkyl disilazane, and organoalkoxysilanes such as $C_6H_{13}Si(OCH_3)_3$, $C_8H_{17}Si(OC_2H_5)_3$, $C_{10}H_{21}Si(OCH_3)_3$, $C_{12}H_{25}Si(OCH_3)_3$, $C_{14}H_{29}Si(OC_2H_5)_3$, and $C_6H_5CH_2CH_2Si(OCH_3)_3$. Other treating agents that can be used include alkylthiols, fatty acids, titanates, titanate coupling agents, zirconate coupling agents, and combinations thereof.

Alternatively, ingredient (G) may comprise an alkoxysilane having the formula: $R^{13}{}_oSi(OR^{14})_{(4-p)}$, where subscript p may have a value ranging from 1 to 3, alternatively subscript p is 3. Each $R^{13}$ is independently a monovalent organic group, such as a monovalent hydrocarbon group of 1 to 50 carbon atoms, alternatively 8 to 30 carbon atoms, alternatively 8 to 18 carbon atoms. $R^{13}$ is exemplified by alkyl groups such as hexyl, octyl, dodecyl, tetradecyl, hexadecyl, and octadecyl; and aromatic groups such as benzyl and phenylethyl. $R^{13}$ may be saturated or unsaturated, and branched or unbranched. Alternatively, $R^{13}$ may be saturated and unbranched.

Each $R^{14}$ is independently a saturated hydrocarbon group of 1 to 4 carbon atoms, alternatively 1 to 2 carbon atoms. Ingredient (G) is exemplified by hexyltrimethoxysilane, octyltriethoxysilane, decyltrimethoxysilane, dodecyltrimethoxysilane, tetradecyltrimethoxysilane, phenylethyltrimethoxysilane, octadecyltrimethoxysilane, octadecyltriethoxysilane, and combinations thereof.

Alkoxy-functional oligosiloxanes may also be used as treating agents. For example, suitable alkoxy-functional oligosiloxanes include those of the formula $(R^{15}O)_qSi(OSiR^{16}{}_2R^{17})_{(4-q)}$. In this formula, subscript q is 1, 2 or 3, alternatively subscript q is 3. Each $R^{15}$ may be an alkyl group. Each $R^{16}$ may be an unsaturated monovalent hydrocarbon group of 1 to 10 carbon atoms. Each $R^{17}$ may be an unsaturated monovalent hydrocarbon group having at least 10 carbon atoms.

Certain particulates, such as metal fillers may be treated with alkylthiols such as octadecyl mercaptan; fatty acids such as oleic acid and stearic acid; and a combination thereof.

Other treating agents include alkenyl functional polyorganosiloxanes. Suitable alkenyl functional polyorganosiloxanes include, but are not limited to:

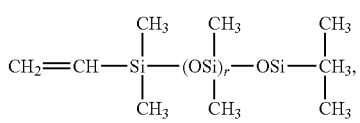

where subscript r has a value up to 1,500.

Alternative, a polyorganosiloxane capable of hydrogen bonding is useful as a treating agent. This strategy to treating surface of a filler takes advantage of multiple hydrogen bonds, either clustered or dispersed or both, as the means to tether the compatibilization moiety to the filler surface. The polyorganosiloxane capable of hydrogen bonding has an average, per molecule, of at least one silicon-bonded group capable of hydrogen bonding. The group may be selected from: an organic group having multiple hydroxyl functionalities or an organic group having at least one amino functional group. The polyorganosiloxane capable of hydrogen bonding means that hydrogen bonding is the primary mode of attachment for the polyorganosiloxane to a filler. The polyorganosiloxane may be incapable of forming covalent bonds with the filler. The polyorganosiloxane may be free of condensable silyl groups e.g., silicon bonded alkoxy groups, silazanes, and silanols. The polyorganosiloxane capable of hydrogen bonding may be selected from the group consisting of a saccharide-siloxane polymer, an amino-functional polyorganosiloxane, and a combination thereof. Alternatively, the polyorganosiloxane capable of hydrogen bonding may be a saccharide-siloxane polymer.

Ingredient (H) is a biocide. The amount of ingredient (H) can vary depending on factors including the type of biocide selected and the benefit desired. However, the amount of ingredient (H) may range from greater than 0% to 5% based on the weight of all ingredients in the composition. Ingredient (H) is exemplified by (h1) a fungicide, (h2) an herbicide, (h3) a pesticide, (h4) an antimicrobial, or a combination thereof.

Ingredient (h1) is a fungicide, for example, these include N-substituted benzimidazole carbamate, benzimidazolyl carbamate such as methyl 2-benzimidazolylcarbamate, ethyl 2-benzimidazolylcarbamate, isopropyl 2-benzimidazolylcarbamate, methyl N-{2-[1-(N,N-dimethylcarbamoyl)benzimidazolyl]}carbamate, methyl N-{2-[1-(N,N-dimethylcarbamoyl)-6-methylbenzimidazolyl]}carbamate, methyl N-{2-[1-(N,N-dimethylcarbamoyl)-5-methylbenzimidazolyl]}carbamate, methyl N-{2-[1-(N-methylcarbamoyl)benzimidazolyl]}carbamate, methyl N-{2-[1-(N-methylcarbamoyl)-6-methylbenzimidazolyl]}carbamate, methyl N-{2-[1-(N-methylcarbamoyl)-5-methylbenzimidazolyl]}carbamate, ethyl N-{2-[1-(N,N-dimethylcarbamoyl)benzimidazolyl]}carbamate, ethyl N-{2-[2-(N-methylcarbamoyl)benzimidazolyl]}carbamate, ethyl N-{2-[1-(N,N-dimethylcarbamoyl)-6-methylbenzimidazolyl]}carbamate, ethyl N-{2-[1-(N-methylcarbamoyl)-6-methylbenzimidazolyl]}carbamate, isopropyl N-{2-[1-(N,N-dimethylcarbamoyl)benzimidazolyl]}carbamate, isopropyl N-{2-[1-(N-methylcarbamoyl)benzimidazolyl]}carbamate, methyl N-{2-[1-(N-propylcarbamoyl)benzimidazolyl]}carbamate, methyl N-{2-[1-(N-butylcarbamoyl)benzimidazolyl]}carbamate, methoxyethyl N-{2-[1-(N-propylcarbamoyl)benzimidazolyl]}carbamate, methoxyethyl N-{2-[1-(N-butylcarbamoyl)benzimidazolyl]}carbamate, ethoxyethyl N-{2-[1-(N-propylcarbamoyl)benzimidazolyl]}carbamate, ethoxyethyl N-{2-[1-(N-butylcarbamoyl)benzimidazolyl]}carbamate, methyl N-{1-(N,N-dimethylcarbamoyloxy)benzimidazolyl]}carbamate, methyl N-{2-[N-methylcarbamoyloxy)benzimidazolyl]}carbamate, methyl N-{2-[1-(N-butylcarbamoyloxy)benzoimidazolyl]}carbamate, ethoxyethyl N-{2-[1-(N-propylcarbamoyl)benzimidazolyl]}carbamate, ethoxyethyl N-{2-[1-(N-butylcarbamoyloxy)benzoimidazolyl]}carbamate, methyl N-{2-[1-(N,N-dimethylcarbamoyl)-6-chlorobenzimidazolyl]}carbamate, and methyl N-{2-[1-(N,N-dimethylcarbamoyl)-6-nitrobenzimidazolyl]}carbamate; 10,10'-oxybisphenoxarsine (trade name: Vinyzene, OBPA), di-iodomethyl-para-tolylsulfone, benzothiophene-2-cyclohexylcarboxamide-S,S-dioxide, N-(fluordichloridemethylthio)phthalimide (trade names: Fluor-Folper, Preventol A3); methyl-benzimideazol-2-ylcarbamate (trade names: Carbendazim, Preventol BCM), Zinc-bis(2-pyridylthio-1-oxide) (zinc pyrithion) 2-(4-thiazolyl)-benzimidazol, N-phenyl-iodpropargylcarbamate, N-octyl-4-isothiazolin-3-on, 4,5-dichloride-2-n-octyl-4-isothiazolin-3-on, N-butyl-1,2-benzisothiazolin-3-on and/or Triazolyl-compounds, such as tebuconazol in combination with zeolites containing silver.

Ingredient (h2) is an herbicide, for example, suitable herbicides include amide herbicides such as allidochlor N,N-diallyl-2-chloroacetamide; CDEA 2-chloro-N,N-diethylacetamide; etnipromid (RS)-2-[5-(2,4-dichlorophenoxy)-2-nitrophenoxy]-N-ethylpropionamide; anilide herbicides such as cisanilide cis-2,5-dimethylpyrrolidine-1-carboxanilide; flufenacet 4'-fluoro-N-isopropyl-2-[5-(trifluoromethyl)-1,3,4-thiadiazol-2-yloxy]acetanilide; naproanilide (RS)-α-2-naphthoxypropionanilide; arylalanine herbicides such as benzoylprop N-benzoyl-N-(3,4-dichlorophenyl)-DL-alanine; flamprop-M N-benzoyl-N-(3-chloro-4-fluorophenyl)-D-alanine; chloroacetanilide herbicides such as butachlor N-butoxymethyl-2-chloro-2,6'-diethylacetanilide; metazachlor 2-chloro-N-(pyrazol-1-ylmethyl)acet-2',6'-xylidide; prynachlor (RS)-2-chloro-N-(1-methylprop-2-ynyl)acetanilide; sulphonanilide herbicides such as cloransulam 3-chloro-2-(5-ethoxy-7-fluoro[1,2,4]triazolo[1,5-c]pyrimidin-2-ylsulphonamido)benzoic acid; metosulam 2',6'-dichloro-5,7-dimethoxy-3'-methyl[1,2,4]triazolo[1,5-a]pyrimidine-2-sulphonanilide; antibiotic herbicides such as bilanafos 4-[hydroxy(methyl)phosphinoyl]-L-homoalanyl-L-alanyl-L-alanine; benzoic acid herbicides such as chloramben 3-amino-2,5-dichlorobenzoic acid; 2,3,6-TBA 2,3,6-trichlorobenzoic acid; pyrimidinyloxybenzoic acid herbicides such as bispyribac 2,6-bis(4,6-dimethoxypyrimidin-2-yloxy)benzoic acid; pyrimidinylthiobenzoic acid herbicides such as pyrithiobac 2-chloro-6-(4,6-dimethoxypyrimidin-2-ylthio) benzoic acid; phthalic acid herbicides such as chlorthal tetrachloroterephthalic acid; picolinic acid herbicides such as aminopyralid 4-amino-3,6-dichloropyridine-2-carboxylic acid; quinolinecarboxylic acid herbicides such as quinclorac 3,7-dichloroquinoline-8-carboxylic acid; arsenical herbicides such as CMA calcium bis(hydrogen methylarsonate); MAMA ammonium hydrogen methylarsonate; sodium arsenite; benzoylcyclohexanedione herbicides such as mesotrione 2-(4-mesyl-2-nitrobenzoyl)cyclohexane-1,3-dione; benzofuranyl alkylsulphonate herbicides such as benfuresate 2,3-dihydro-3,3-dimethylbenzofuran-5-yl ethanesulphonate; carbamate herbicides such as carboxazole methyl 5-tert-butyl-1,2-oxazol-3-ylcarbamate; fenasulam methyl 4-[2-(4-chloro-o-tolyloxy)acetamido]phenylsulphonylcarbamate; carbanilate herbicides such as BCPC (RS)-sec-butyl 3-chlorocarbanilate; desmedipham ethyl 3-phenylcarbamoyloxyphenylcarbamate; swep methyl 3,4-dichlorocarbanilate; cyclohexene oxime herbicides such as butroxydim (RS)-(EZ)-5-(3-butyryl-2,4,6-trimethylphenyl)-2-(1-ethoxyiminopropyl)-3-hydroxycyclohex-2-en-1-one; tepraloxydim (RS)-(EZ)-2-{1-[(2E)-3-chloroallyloxyimino]propyl}-3-hydroxy-5-perhydropyran-4-ylcyclohex-2-en-1-one; cyclopropylisoxazole herbicides such as isoxachlortole 4-chloro-2- mesylphenyl 5-cyclopropyl-1,2-oxazol-4-yl ketone; dicarboximide herbicides such as flumezin 2-methyl-4-(α,α, α-trifluoro-m-tolyl)-1,2,4-oxadiazinane-3,5-dione; dinitroaniline herbicides such as ethalfluralin N-ethyl-α,α,α-trifluoro-N-(2-methylallyl)-2,6-dinitro-p-toluidine; prodiamine 5-dipropylamino-α,α,α-trifluoro-4,6-dinitro-o-toluidine; dinitrophenol herbicides such as dinoprop 4,6-dinitro-o-cymen-3-ol; etinofen α-ethoxy-4,6-dinitro-o-cresol; diphenyl ether herbicides such as ethoxyfen O-[2-chloro-5-(2-chloro-α,α,α-trifluoro-p-tolyloxy)benzoyl]-L-lactic acid; nitrophenyl ether herbicides such as aclonifen 2-chloro-6-nitro-3-phenoxyaniline; nitrofen 2,4-dichlorophenyl 4-nitrophenyl ether; dithiocarbamate herbicides such as dazomet 3,5-dimethyl-1,3,5-thiadiazinane-2-thione; halogenated aliphatic herbicides such as dalapon 2,2-dichloropropionic acid; chloroacetic acid; imidazolinone herbicides such as imazapyr (RS)-2-(4-isopropyl-4-methyl-5-oxo-2-imidazolin-2-yl) nicotinic acid; inorganic herbicides such as disodium tetraborate decahydrate; sodium azide; nitrile herbicides such as chloroxynil 3,5-dichloro-4-hydroxybenzonitrile; ioxynil 4-hydroxy-3,5-di-iodobenzonitrile; organophosphorus herbicides such as anilofos S-4-chloro-N-isopropylcarbaniloylmethyl O,O-dimethyl phosphorodithioate; glufosinate 4-[hydroxy(methyl)phosphinoyl]-DL-homoalanine; phenoxy herbicides such as clomeprop (RS)-2-(2,4-dichloro-m-tolyloxy)propionanilide; fenteracol 2-(2,4,5-trichlorophenoxy) ethanol; phenoxyacetic herbicides such as MCPA (4-chloro-2-methylphenoxy)acetic acid; phenoxybutyric herbicides such as MCPB 4-(4-chloro-o-tolyloxy)butyric acid; phenoxypropionic herbicides such as fenoprop (RS)-2-(2,4,5-trichlorophenoxy)propionic acid; aryloxyphenoxypropionic herbicides such as isoxapyrifop (RS)-2-[2[4-(3,5-dichloro-2-pyridyloxy)phenoxy]propionyl]isoxazolidine; phenylenediamine herbicides such as dinitramine $N^1,N^1$-diethyl-2,6-dinitro-4-trifluoromethyl-m-phenylenediamine, pyrazolyloxyacetophenone herbicides such as pyrazoxyfen 2-[4-(2,4-dichlorobenzoyl)-1,3-dimethylpyrazol-5-yloxy] acetophenone; pyrazolylphenyl herbicides such as pyraflufen 2-chloro-5-(4-chloro-5-difluoromethoxy-1-methylpyrazol-3-yl)-4-fluorophenoxyacetic acid; pyridazine herbicides such as pyridafol 6-chloro-3-phenylpyridazin-4-ol; pyridazinone herbicides such as chloridazon 5-amino-4-chloro-2-phenylpyridazin-3(2H)-one; oxapyrazon 5-bromo-1,6-dihydro-6-oxo-1-phenylpyridazin-4-yloxamic acid; pyridine herbicides such as fluroxypyr 4-amino-3,5-dichloro-6-fluoro-2-pyridyloxyacetic acid; thiazopyrmethyl 2-difluoromethyl-5-(4,5-dihydro-1,3-thiazol-2-yl)-4-isobutyl-6-trifluoromethylnicotinate; pyrimidinediamine herbicides such as iprymidam 6-chloro-$N^4$-isopropylpyrimidine-2,4-diamine; quaternary ammonium herbicides such as diethamquat 1,1'-bis(diethylcarbamoylmethyl)-4,4'-bipyridinium; paraquat 1,1'-dimethyl-4,4'-bipyridinium; thiocarbamate herbicides such as cycloate S-ethyl cyclohexyl(ethyl)thiocarbamate; tiocarbazil S-benzyl di-sec-butylthiocarbamate; thiocarbonate herbicides such as EXD O,O-diethyl dithiobis (thioformate); thiourea herbicides such as methiuron 1,1-dimethyl-3-m-tolyl-2-thiourea; triazine herbicides such as triaziflam (RS)—N-[2-(3,5-dimethylphenoxy)-1-methylethyl]-6-(1-fluoro-1-methylethyl)-1,3,5-triazine-2,4-diamine; chlorotriazine herbicides such as cyprazine 6-chloro-$N^2$-cyclopropyl-$N^4$-isopropyl-1,3,5-triazine-2,4-diamine; propazine 6-chloro-$N^2,N^4$-di-isopropyl-1,3,5-triazine-2,4-diamine; methoxytriazine herbicides such as prometon $N^2,N^4$-di-isopropyl-6-methoxy-1,3,5-triazine-2,4-diamine; methylthiotriazine herbicides such as cyanatryn 2-(4-ethylamino-6-methylthio-1,3,5-triazin-2-ylamino)-2-methylpropionitrile; triazinone herbicides such as hexazinone 3-cyclohexyl-6-dimethylamino-1-methyl-1,3,5-triazine-2,4(1H, 3H)-dione; triazole herbicides such as epronaz N-ethyl-N-propyl-3-propylsulphonyl-1H-1,2,4-triazole-1-carboxamide; triazolone herbicides such as carfentrazone (RS)-2-chloro-3-{2-chloro-5-[4-(difluoromethyl)-4,5-dihydro-3-methyl-5-oxo-1H-1,2,4-triazol-1-yl]-4-fluorophenyl}propionic acid; triazolopyrimidine herbicides such as florasulam 2',6',8-trifluoro-5-methoxy[1,2,4]triazolo [1,5-c]pyrimidine-2-sulphonanilide; uracil herbicides such as flupropacil isopropyl 2-chloro-5-(1,2,3,6-tetrahydro-3-methyl-2,6-dioxo-4-trifluoromethylpyrim idin-1-yl)benzoate; urea herbicides such as cycluron 3-cyclo-octyl-1,1-dimethylurea; monisouron 1-(5-tert-butyl-1,2-oxazol-3-yl)-3-methylurea; phenylurea herbicides such as chloroxuron 3-[4-(4-chlorophenoxy)phenyl]-1,1-dimethylurea; siduron 1-(2-methylcyclohexyl)-3-phenylurea; pyrimidinylsulphonylurea herbicides such as flazasulphuron 1-(4,6-dimethoxypyrimidin-2-yl)-3-(3-trifluoromethyl-2-pyridylsulphonyl) urea; pyrazosulphuron 5-[(4,6-dimethoxypyrimidin-2-ylcarbamoyl)sulphamoyl]-1-methylpyrazole-4-carboxylic acid; triazinylsulphonylurea herbicides such as thifensulphuron 3-(4-methoxy-6-methyl-1,3,5-triazin-2-ylcarbamoylsulphamoyl)thiophene-2-carboxylic acid; thiadiazolylurea herbicides such as tebuthiuron 1-(5-tert-butyl-1,3,4-thiadiazol-2-yl)-1,3-dimethylurea; and/or unclassified herbicides such as chlorfenac (2,3,6-trichlorophenyl)acetic acid; methazole 2-(3,4-dichlorophenyl)-4-methyl-1,2,4-oxadiazolidine-3,5-dione; tritac (RS)-1-(2,3,6-trichlorobenzyloxy)propan-2-ol; 2,4-D, chlorimuron, and fenoxaprop; and combinations thereof.

Ingredient (h3) is a pesticide. Suitable pesticides are exemplified by atrazine, diazinon, and chlorpyrifos. For purposes of this application, pesticide includes insect repellents such as N,N-diethyl-meta-toluamide and pyrethroids such as pyrethrin.

Ingredient (h4) is an antimicrobial agent. Suitable antimicrobials are commercially available, such as DOW CORNING® 5700 and DOW CORNING® 5772, which are from Dow Corning Corporation of Midland, Mich., U.S.A.

Alternatively, ingredient (H) may comprise a boron containing material, e.g., boric anhydride, borax, or disodium octaborate tetrahydrate; which may function as a pesticide, fungicide, and/or flame retardant.

Ingredient (J) is a flame retardant. Suitable flame retardants may include, for example, carbon black, hydrated aluminum hydroxide, and silicates such as wollastonite, platinum and platinum compounds. Alternatively, the flame retardant may be selected from halogen based flame-retardants such as decabromodiphenyloxide, octabromordiphenyl oxide, hexabromocyclododecane, decabromobiphenyl oxide, diphenyoxybenzene, ethylene bis-tetrabromophthalmide, pentabromoethyl benzene, pentabromobenzyl acrylate, tribromophenyl maleic imide, tetrabromobisphenyl A, bis-(tribromophenoxy) ethane, bis-(pentabromophenoxy) ethane, polydibomophenylene oxide, tribromophenylallyl ether, bis-dibromopropyl ether, tetrabromophthalic anhydride, dibromoneopentyl gycol, dibromoethyl dibromocyclohexane, pentabromodiphenyl oxide, tribromostyrene, pentabromochlorocyclohexane, tetrabromoxylene, hexabromocyclododecane, brominated polystyrene, tetradecabromodiphenoxybenzene, trifluoropropene and PVC. Alternatively, the flame retardant may be selected from phosphorus based flame-retardants such as (2,3-dibromopropyl)-phosphate, phosphorus, cyclic phosphates, triaryl phosphate, bis-melaminium pentate, pentaerythritol bicyclic phosphate, dimethyl methyl phosphate, phosphine oxide diol, triphenyl phosphate, tris-(2-chloroethyl) phosphate, phosphate esters such as tricreyl, trixylenyl, isodecyl diphenyl, ethylhexyl diphenyl, phosphate salts of various amines such as ammonium phosphate, trioctyl, tributyl or tris-butoxyethyl phosphate ester. Other flame retardants may include tetraalkyl lead compounds such as tetraethyl lead, iron pentacarbonyl, manganese methyl cyclopentadienyl tricarbonyl, melamine and derivatives such as melamine salts, guanidine, dicyandiamide, ammonium sulphamate, alumina trihydrate, and magnesium hydroxide alumina trihydrate.

The amount of flame retardant can vary depending on factors such as the flame retardant selected and whether solvent is present. However, the amount of flame retardant in the composition may range from greater than 0% to 10% based on the combined weight of all ingredients in the composition.

Ingredient (K) is a surface modifier. Suitable surface modifiers are exemplified by (k1) an adhesion promoter or (k2) a release agent. Suitable adhesion promoters for ingredient (k1) may comprise a transition metal chelate, a hydrocarbonoxysilane such as an alkoxysilane, a combination of an alkoxysilane and a hydroxy-functional polyorganosiloxane, an aminofunctional silane, or a combination thereof. Adhesion promoters are known in the art and may comprise silanes having the formula $R^{24}_t R^{25}_u Si(OR^{26})_{4-(t+u)}$ where each $R^{24}$ is independently a monovalent organic group having at least 3 carbon atoms; $R^{25}$ contains at least one SiC bonded substituent having an adhesion-promoting group, such as amino, epoxy, mercapto or acrylate groups; subscript t has a value ranging from 0 to 2; subscript u is either 1 or 2; and the sum of (t+u) is not greater than 3. Alternatively, the adhesion promoter may comprise a partial condensate of the above silane. Alternatively, the adhesion promoter may comprise a combination of an alkoxysilane and a hydroxy-functional polyorganosiloxane.

Alternatively, the adhesion promoter may comprise an unsaturated or epoxy-functional compound. The adhesion promoter may comprise an unsaturated or epoxy-functional alkoxysilane. For example, the functional alkoxysilane can have the formula $R^{27}_v Si(OR^{28})_{(4-v)}$, where subscript v is 1, 2, or 3, alternatively subscript v is 1. Each $R^{27}$ is independently a monovalent organic group with the proviso that at least one $R^{27}$ is an unsaturated organic group or an epoxy-functional organic group. Epoxy-functional organic groups for $R^{27}$ are exemplified by 3-glycidoxypropyl and (epoxycyclohexyl) ethyl. Unsaturated organic groups for $R^{27}$ are exemplified by 3-methacryloyloxypropyl, 3-acryloyloxypropyl, and unsaturated monovalent hydrocarbon groups such as vinyl, allyl, hexenyl, undecylenyl. Each $R^{28}$ is independently a saturated hydrocarbon group of 1 to 4 carbon atoms, alternatively 1 to 2 carbon atoms. $R^{28}$ is exemplified by methyl, ethyl, propyl, and butyl.

Examples of suitable epoxy-functional alkoxysilanes include 3-glycidoxypropyltrimethoxysilane, 3-glycidoxypropyltriethoxysilane, (epoxycyclohexyl)ethyldimethoxysilane, (epoxycyclohexyl)ethyldiethoxysilane and combinations thereof. Examples of suitable unsaturated alkoxysilanes include vinyltrimethoxysilane, allyltrimethoxysilane, allyltriethoxysilane, hexenyltrimethoxysilane, undecylenyltrimethoxysilane, 3-methacryloyloxypropyl trimethoxysilane, 3-methacryloyloxypropyl triethoxysilane, 3-acryloyloxypropyl trimethoxysilane, 3-acryloyloxypropyl triethoxysilane, and combinations thereof.

Alternatively, the adhesion promoter may comprise an epoxy-functional siloxane such as a reaction product of a hydroxy-terminated polyorganosiloxane with an epoxy-functional alkoxysilane, as described above, or a physical blend of the hydroxy-terminated polyorganosiloxane with the epoxy-functional alkoxysilane. The adhesion promoter may comprise a combination of an epoxy-functional alkoxysilane and an epoxy-functional siloxane. For example, the adhesion promoter is exemplified by a mixture of 3-glycidoxypropyltrimethoxysilane and a reaction product of hydroxy-terminated methylvinylsiloxane with 3-glycidoxypropyltrimethoxysilane, or a mixture of 3-glycidoxypropyltrimethoxysilane and a hydroxy-terminated methylvinylsiloxane, or a mixture of 3-glycidoxypropyltrimethoxysilane and a hydroxy-terminated methylvinyl/dimethylsiloxane copolymer.

Alternatively, the adhesion promoter may comprise an aminofunctional silane, such as an aminofunctional alkoxysilane exemplified by $H_2N(CH_2)_2Si(OCH_3)_3$, $H_2N(CH_2)_2Si(OCH_2CH_3)_3$, $H_2N(CH_2)_3Si(OCH_3)_3$, $H_2N(CH_2)_3Si(OCH_2CH_3)_3$, $CH_3NH(CH_2)_2Si(OCH_3)_3$, $CH_3NH(CH_2)_3Si(OCH_2CH_3)_3$, $CH_3NH(CH_2)_5Si(OCH_3)_3$, $CH_3NH(CH_2)_5Si(OCH_2CH_3)_3$, $H_2N(CH_2)_2NH(CH_2)_3Si(OCH_3)_3$, $H_2N(CH_2)_2NH(CH_2)_3Si(OCH_2CH_3)_3$, $CH_3NH(CH_2)_2NH(CH_2)_3Si(OCH_3)_3$, $CH_3NH(CH_2)_2NH(CH_2)_3Si(OCH_2CH_3)_3$, $C_4H_9NH(CH_2)_2NH(CH_2)_3Si(OCH_3)_3$, $C_4H_9NH(CH_2)_2NH(CH_2)_3Si(OCH_2CH_3)_3$, $H_2N(CH_2)_2SiCH_3(OCH_3)_2$, $H_2N(CH_2)_2SiCH_3(OCH_2CH_3)_2$, $H_2N(CH_2)_3SiCH_3(OCH_3)_2$, $H_2N(CH_2)_3SiCH_3(OCH_2CH_3)_2$, $CH_3NH(CH_2)_3SiCH_3(OCH_3)_2$, $CH_3NH(CH_2)_3SiCH_3(OCH_2CH_3)_2$, $CH_3NH(CH_2)_5SiCH_3(OCH_3)_2$, $CH_3NH(CH_2)_5SiCH_3(OCH_2CH_3)_2$, $H_2N(CH_2)_2NH(CH_2)_3SiCH_3(OCH_3)_2$, $H_2N(CH_2)_2NH(CH_2)_3SiCH_3(OCH_2CH_3)_2$, $CH_3NH(CH_2)_2NH(CH_2)_3SiCH_3(OCH_3)_2$, $CH_3NH(CH_2)_2NH(CH_2)_3SiCH_3(OCH_2CH_3)_2$, $C_4H_9NH(CH_2)_2NH(CH_2)_3SiCH_3(OCH_3)_2$, $C_4H_9NH(CH_2)_2NH(CH_2)_3SiCH_3(OCH_2CH_3)_2$, and a combination thereof.

Alternatively, the adhesion promoter may comprise a transition metal chelate. Suitable transition metal chelates include titanates, zirconates such as zirconium acetylacetonate, aluminum chelates such as aluminum acetylacetonate, and combinations thereof.

Ingredient (k2) is a release agent. Suitable release agents are exemplified by fluorinated compounds, such as fluorofunctional silicones, or fluoro-functional organic compounds.

Alternatively, the surface modifier for ingredient (K) may be used to change the appearance of the surface of a reaction product of the composition. For example, surface modifier may be used to increase gloss of the surface of a reaction product of the composition. Such a surface modifier may comprise a polydiorganosiloxane with alkyl and aryl groups. For example, DOW CORNING® 550 Fluid is a trimethylsiloxy-terminated poly(dimethyl/methylphenyl)siloxane with a viscosity of 125 cSt that is commercially available from Dow Corning Corporation.

Alternatively, ingredient (K) may be a natural oil obtained from a plant or animal source, such as linseed oil, tung oil, soybean oil, castor oil, fish oil, hempseed oil, cottonseed oil, oiticica oil, and rapeseed oil.

The exact amount of ingredient (K) depends on various factors including the type of surface modifier selected as ingredient (K) and the end use of the composition and its reaction product. However, ingredient (K), when present, may be added to the composition in an amount ranging from 0.01 to 50 weight parts based on the weight of the composition, alternatively 0.01 to 10 weight parts, and alternatively 0.01 to 5 weight parts. Ingredient (K) may be one adhesion promoter. Alternatively, ingredient (K) may comprise two or more different surface modifiers that differ in at least one of the following properties: structure, viscosity, average molecular weight, polymer units, and sequence.

Chain lengtheners may include difunctional silanes and difunctional siloxanes, which extend the length of polyorganosiloxane chains before crosslinking occurs. Chain lengtheners may be used to reduce the modulus of elongation of the cured product. Chain lengtheners and crosslinkers compete in their reactions with the hydrolyzable substituents in ingredient (B). To achieve noticeable chain extension, the difunctional silane has substantially higher reactivity than the trifunctional crosslinker with which it is used. Suitable chain lengtheners include diamidosilanes such as dialkyldiacetamidosilanes or alkenylalkyldiacetamidosilanes, particularly methylvinyldi(N-methylacetamido)silane, or dimethyldi(N-methylacetamido)silane, diacetoxysilanes such as dialkyldiacetoxysilanes or alkylalkenyldiacetoxysilanes, dieminosilanes such as dialkyldiaminosilanes or alkylalkenyldiaminosilanes, dialkoxysilanes such as dimethyldimethoxysilane, dimethyldiethoxysilane and α-aminoalkyldialkoxyalkylsilanes, polydialkylsiloxanes having a degree of polymerization of from 2 to 25 and having an average per molecule of at least two hydrolyzable groups, such as acetamido or acetoxy or amino or alkoxy or amido or ketoximo substituents, and diketoximinosilanes such as dialkylkdiketoximinosilanes and alkylalkenyldiketoximinosilanes. Ingredient (L) may be one chain lengthener. Alternatively, ingredient (L) may comprise two or more different chain lengtheners that differ in at least one of the following properties: structure, viscosity, average molecular weight, polymer units, and sequence.

Ingredient (M) is and endblocker comprising an M unit, i.e., a siloxane unit of formula $R^{29}_3SiO_{1/2}$, where each $R^{29}$ independently represents a monovalent organic group unreactive ingredient (B), such as a monovalent hydrocarbon group. Ingredient (M) may comprise polyorganosiloxanes endblocked on one terminal end by a triorganosilyl group, e.g., $(CH_3)_3SiO$—, and on the other end by a hydroxyl group. Ingredient (M) may be a polydiorganosiloxane such as a polydimethylsiloxane. The polydiorganosiloxanes having both hydroxyl end groups and triorganosilyl end groups, may have more than 50%, alternatively more than 75%, of the total end groups as hydroxyl groups. The amount of triorganosilyl group in the polydimethylsiloxane may be used to regulate the modulus of the reaction product prepared by condensation reaction of the composition. Without wishing to be bound by theory, it is thought that higher concentrations of triorganosilyl end groups may provide a lower modulus in certain cured products. Ingredient (M) may be one endblocker. Alternatively, ingredient (M) may comprise two or more different endblockers that differ in at least one of the following properties: structure, viscosity, average molecular weight, polymer units, and sequence.

Ingredient (N) is a non-reactive, elastomeric, organic polymer, i.e., an elastomeric organic polymer that does not react with ingredient (B). Ingredient (N) is compatible with ingredient (B), i.e., ingredient (N) does not form a two-phase system with ingredient (B). Ingredient (N) may have low gas and moisture permeability. Ingredient (N) may have Mn ranging from 30,000 to 75,000. Alternatively, ingredient (N) may be a blend of a higher molecular weight, non-reactive, elastomeric, organic polymer with a lower molecular weight, non-reactive, elastomeric, organic polymer. In this case, the higher molecular weight polymer may have Mn ranging from 100,000 to 600,000 and the lower molecular weight polymer may have Mn ranging from 900 to 10,000, alternatively 900 to 3,000. The value for the lower end of the range for Mn may be selected such that ingredient (N) has compatibility with ingredient (B) and the other ingredients of the composition.

Ingredient (N) may comprise a polyisobutylene. Polyisobutylenes are known in the art and are commercially available. Examples suitable for use as ingredient (N) include polyisobutylenes marketed under the trademark OPPANOL® by BASF Corporation of Germany.

Other polyisobutylenes include different Parleam grades such as highest molecular weight hydrogenated polyisobutene PARLEAM® SV (POLYSYNLANE SV) from NOF CORPORATION Functional Chemicals & Polymers Div., Yebisu Garden Place Tower, 20-3 Ebisu 4-chome, Shibuya-ku, Tokyo 150-6019, Japan (Kinematic Viscosity (98.9° C.) 4700). Other polyisobutylenes are commercially available from ExxonMobil Chemical Co. of Baytown, Tex., U.S.A. and include polyisobutylenes marketed under the trademark VISTANEX®, such as MML-80, MML-100, MML-120, and MML-140. VISTANEX® polyisobutylenes are paraffinic hydrocarbon polymers, composed of long, straight-chain macromolecules containing only chain-end olefinic bonds. VISTANEX® MM polyisobutylenes have viscosity average molecular weight ranging from 70,000 to 90,000. Lower molecular weight polyisobutylenes include VISTANEX® LM, such as LM-MS (viscosity average molecular weight ranging from 8,700 to 10,000 also made by ExxonMobil Chemical Co.) and VISTANEX LM-MH (viscosity average molecular weight of 10,000 to 11,700) as well as Soltex PB-24 (Mn 950) and Indopol® H-100 (Mn 910) and Indopol® H-1200 (Mn 2100) from Amoco. Other polyisobutylenes are marketed under the trademarks NAPVIS® and HYVIS® by BP Chemicals of London, England. These polyisobutylenes include NAPVIS® 200, D10, and DE3; and HYVIS® 200. The NAPVIS® polyisobutylenes may have Mn ranging from 900 to 1300.

Alternatively, ingredient (N) may comprise butyl rubber. Alternatively, ingredient (N) may comprise a styrene-ethylene/butylene-styrene (SEBS) block copolymer, a styrene-ethylene/propylene-styrene (SEPS) block copolymer, or a combination thereof. SEBS and SEPS block copolymers are known in the art and are commercially available as Kraton® G polymers from Kraton Polymers U.S. LLC of Houston, Tex., U.S.A., and as Septon polymers from Kuraray America, Inc., New York, N.Y., U.S.A. Alternatively, ingredient (N) may comprise a polyolefin plastomer. Polyolefin plastomers are known in the art and are commercially available as AFFINITY® GA 1900 and AFFINITY® GA 1950 from Dow Chemical Company, Elastomers & Specialty Products Division, Midland, Mich., U.S.A.

The amount of ingredient (N) may range from 0 parts to 50 parts, alternatively 10 parts to 40 parts, and alternatively 5 parts to 35 parts, based on the weight of the composition. Ingredient (N) may be one non-reactive, elastomeric, organic polymer. Alternatively, ingredient (N) may comprise two or more non-reactive, elastomeric, organic polymers that differ in at least one of the following properties: structure, viscosity, average molecular weight, polymer units, and sequence. Alternatively, ingredient (N) may be added to the composition when ingredient (B) comprises a base polymer with an organic polymer backbone.

Ingredient (O) is an anti-aging additive. The anti-aging additive may comprise an antioxidant, a UV absorber, a UV stabilizer, a heat stabilizer, or a combination thereof. Suitable antioxidants are known in the art and are commercially available. Suitable antioxidants include phenolic antioxidants and combinations of phenolic antioxidants with stabilizers. Phenolic antioxidants include fully sterically hindered phenols and partially hindered phenols. Alternatively, the stabilizer may be a sterically hindered amine such as tetramethyl-piperidine derivatives. Suitable phenolic antioxidants include vitamin E and IRGANOX® 1010 from Ciba Specialty Chemicals, U.S.A. IRGANOX® 1010 comprises pentaerythritol tetrakis(3-(3,5-di-t-butyl-4-hydroxyphenyl)propionate).

Examples of UV absorbers include phenol, 2-(2H-benzotriazol-2-yl)-6-dodecyl-4-methyl-, branched and linear (TINUVIN® 571). Examples of UV stabilizers include bis(1,2,2,6,6-pentamethyl-4-piperidyl) sebacate; methyl 1,2,2,6,6-pentamethyl-4-piperidyl/sebacate; and a combination thereof (TINUVIN® 272). These and other TINUVIN® additives, such as TINUVIN® 765 are commercially available from Ciba Specialty Chemicals of Tarrytown, N.Y., U.S.A. Other UV and light stabilizers are commercially available, and are exemplified by LowLite from Chemtura, OnCap from PolyOne, and Light Stabilizer 210 from E. I. du Pont de Nemours and Company of Delaware, U.S.A. Oligomeric (higher molecular weight) stabilizers may alternatively be used, for example, to minimize potential for migration of the stabilizer out of the composition or the cured product thereof. An example of an oligomeric antioxidant stabilizer (specifically, hindered amine light stabilizer (HALS)) is Ciba TINUVIN® 622, which is a dimethylester of butanedioic acid copolymerized with 4-hydroxy-2,2,6,6-tetramethyl-1-piperidine ethanol. Heat stabilizers may include iron oxides and carbon blacks, iron carboxylate salts, cerium hydrate, barium zirconate, cerium and zirconium octoates, and porphyrins.

The amount of ingredient (O) depends on various factors including the specific anti-aging additive selected and the anti-aging benefit desired. However, the amount of ingredient (O) may range from 0 to 5 weight %, alternatively 0.1% to 4%, and alternatively 0.5% to 3%, based on the weight of the composition. Ingredient (O) may be one anti-aging additive. Alternatively, ingredient (O) may comprise two or more different anti-aging additives.

Ingredient (P) is a water release agent that releases water over an application temperature range. Ingredient (P) is selected such that ingredient (P) contains an amount of water sufficient to partially or fully react the composition and such that ingredient (P) releases the sufficient amount of water when exposed for a sufficient amount of time to a use temperature (i.e., a temperature at which the composition is used). However, ingredient (P) binds the water sufficiently to prevent too much water from being released during the method for making the composition and during storage of the composition. For example, ingredient (P) binds the water sufficiently during compounding of the composition such that sufficient water is available for condensation reaction of the composition during or after the application process in which the composition is used. This "controlled release" property also may provide the benefit of ensuring that not too much water is released too rapidly during the application process, since this may cause bubbling or voiding in the reaction product formed by condensation reaction of the composition. Precipitated calcium carbonate may be used as ingredient (P) when the application temperature ranges from 80° C. to 120° C., alternatively 90° C. to 110° C., and alternatively 90° C. to 100° C. However, when the composition is prepared on a continuous (e.g., twin-screw) compounder, the ingredients may be compounded at a temperature 20° C. to 30° C. above the application temperature range for a short amount of time. Therefore, ingredient (P) is selected to ensure that not all of the water content is released during compounding; however ingredient (P) releases a sufficient amount of water for condensation reaction of the composition when exposed to the application temperature range for a sufficient period of time.

Examples of suitable water release agents are exemplified by metal salt hydrates, hydrated molecular sieves, and precipitated calcium carbonate, which is available from Solvay under the trademark WINNOFIL® SPM. The water release agent selected can depend on various factors including other ingredients selected for the composition, including catalyst type and amount; and the process conditions during compounding, packaging, and application. In a twin-screw compounder, residence time may be less than a few minutes, typically less than 1 to 2 minutes. The ingredients are heated rapidly because the surface area/volume ratio in the barrels and along the screw is high and heat is induced by shearing the ingredients. How much water is removed from ingredient (P) depends on the water binding capabilities, the temperature, the exposure time (duration), and the level of vacuum used to strip the composition passing through the compounder. Without wishing to be bound by theory, it is thought that with a twin screw compounding temperature of 120° C. there would remain enough water on the precipitated $CaCO_3$ to cause the composition to react by condensation reaction over a period of 1 to 2 weeks at room temperature when the composition has been applied at 90° C.

A water release agent may be added to the composition, for example, when the base polymer has low water permeability (e.g., when the base polymer has an organic polymer backbone) and/or the amount of ingredient (P) in the composition depends on various factors including the selection of ingredients (A), (B) and (C) and whether any additional ingredients are present, however the amount of ingredient (P) may range from 5 to 30 parts based on the weight of the composition.

Without wishing to be bound by theory, it is thought when the composition is heated to the application temperature, the heat would liberate the water, and the water would react with the hydrolyzable groups on ingredient (B) to react the composition. By-products such as alcohols and/or water left in the composition may be bound by a drying agent, thereby allowing the condensation reaction (which is an equilibrium reaction) to proceed toward completion.

Ingredient (Q) is a pigment. For purposes of this application, the term 'pigment' includes any ingredient used to impart color to a reaction product of a composition described herein. The amount of pigment depends on various factors including the type of pigment selected and the desired degree of coloration of the reaction product. For example, the composition may comprise 0 to 20%, alternatively 0.001% to 5%, of a pigment based on the weight of all ingredients in the composition.

Examples of suitable pigments include indigo, titanium dioxide Stan-Tone 50SP01 Green (which is commercially available from PolyOne) and carbon black. Representative, non-limiting examples of carbon black include Shawinigan Acetylene black, which is commercially available from Chevron Phillips Chemical Company LP; SUPERJET® Carbon Black (LB-1011) supplied by Elementis Pigments Inc., of Fairview Heights, Ill. U.S.A.; SR 511 supplied by Sid Richardson Carbon Co, of Akron, Ohio U.S.A.; and N330, N550, N762, N990 (from Degussa Engineered Carbons of Parsippany, N.J., U.S.A.).

The composition may optionally further comprise up to 5%, alternatively 1% to 2 based on the weight of the composition of ingredient (R) a rheological additive for modifying rheology of the composition. Rheological additives are known in the art and are commercially available. Examples include polyamides, Polyvest, which is commercially available from Evonik, Disparlon from King Industries, Kevlar Fibre Pulp from Du Pont, Rheospan from Nanocor, and Ircogel from Lubrizol. Other suitable rheological additives include polyamide waxes; hydrogenated castor oil derivatives; and metal soaps such as calcium stearate, aluminum stearate and barium stearate, and combinations thereof.

Alternatively, ingredient (R) may comprise a microcrystalline wax that is a solid at 25° C. (wax). The melting point may be selected such that the wax has a melting point at the low end of the desired application temperature range. Without wishing to be bound by theory, it is thought that ingredient (R) acts as a process aid that improves flow properties while allowing rapid green strength development (i.e., a strong increase in viscosity, corresponding to increase in the load carrying capability of a seal prepared from the composition, with a temperature drop) upon cooling the composition a few degrees, for example, after the composition is applied to a substrate. Without wishing to be bound by theory, it is thought that incorporation of wax may also facilitate incorporation of fillers, compounding and de-airing (during production of the composition), and mixing (static or dynamic mixing during application of parts of a multiple-part composition). It is thought that the wax, when molten, serves as a process aid, substantially easing the incorporation of filler in the composition during compounding, the compounding process itself, as well as in during a de-airing step, if used. The wax, with a melt temperature below 100° C., may facilitate mixing of the parts of a multiple part composition before application, even in a simple static mixer. The wax may also facilitate application of the composition at temperatures ranging from 80° C. to 110° C., alternatively 90° C. to 100° C. with good rheology.

Waxes suitable for use as ingredient (R) may be non-polar hydrocarbons. The waxes may have branched structures, cyclic structures, or combinations thereof. For example, petroleum microcrystalline waxes are available from Strahl & Pitsch, Inc., of West Babylon, N.Y., U.S.A. and include SP 96 (melting point ranging from 62° C. to 69° C.), SP 18 (melting point ranging from 73° C. to 80° C.), SP 19 (melting point ranging from 76° C. to 83° C.), SP 26 (melting point ranging from 76° C. to 83° C.), SP 60 (melting point ranging from 79° C. to 85° C.), SP 617 (melting point ranging from 88° C. to 93° C.), SP 89 (melting point ranging from 90° C. to 95° C.), and SP 624 (melting point ranging from 90° C. to 95° C.). Other petroleum microcrystalline waxes include waxes marketed under the trademark Multiwax® by Crompton Corporation of Petrolia, Pa., U.S.A. These waxes include 180-W, which comprises saturated branched and cyclic non-polar hydrocarbons and has melting point ranging from 79° C. to 87° C.; Multiwax® W-445, which comprises saturated branched and cyclic non-polar hydrocarbons, and has melting point ranging from 76° C. to 83° C.; and Multiwax® W-835, which comprises saturated branched and cyclic non-polar hydrocarbons, and has melting point ranging from 73° C. to 80° C.

The amount of ingredient (R) depends on various factors including the specific rheological additive selected and the selections of the other ingredients of the composition. However, the amount of ingredient (R) may range from 0 parts to 20 parts, alternatively 1 part to 15 parts, and alternatively 1 part to 5 parts based on the weight of the composition. Ingredient (R) may be one rheological additive. Alternatively, ingredient (R) may comprise two or more different rheological additives.

A vehicle (e.g., a solvent and/or diluent) may be used in the composition. Vehicle may facilitate flow of the composition and introduction of certain ingredients, such as silicone resin. Vehicles used herein are those that help fluidize the ingredients of the composition but essentially do not react with any of these ingredients. Vehicle may be selected based on solubility the ingredients in the composition and volatility. The solubility refers to the vehicle being sufficient to dissolve and/or disperse ingredients of the composition. Volatility refers to vapor pressure of the vehicle. If the vehicle is too volatile (having too high vapor pressure) bubbles may form in the composition at the application temperature, and the bubbles may cause cracks or otherwise weaken or detrimentally affect properties of the cured product. However, if the vehicle is not volatile enough (too low vapor pressure) the vehicle may remain as a plasticizer in the reaction product of the composition, or the amount of time for the reaction product to develop physical properties may be longer than desired.

Suitable vehicles include polyorganosiloxanes with suitable vapor pressures, such as hexamethyldisiloxane, octamethyltrisiloxane, hexamethylcyclotrisiloxane, and other low molecular weight polyorganosiloxanes, such as 0.5 to 1.5 centiStoke (cSt) Dow Corning® 200 Fluids and DOW CORNING® OS FLUIDS, which are commercially available from Dow Corning Corporation of Midland, Mich., U.S.A.

Alternatively, the vehicle may be an organic solvent. The organic solvent can be an alcohol such as methanol, ethanol, isopropanol, butanol, or n-propanol; a ketone such as acetone, methylethyl ketone, or methyl isobutyl ketone; an aromatic hydrocarbon such as benzene, toluene, or xylene; an aliphatic hydrocarbon such as heptane, hexane, or octane; a glycol ether such as propylene glycol methyl ether, dipropylene glycol methyl ether, propylene glycol n-butyl ether, propylene glycol n-propyl ether, or ethylene glycol n-butyl ether, a halogenated hydrocarbon such as dichloromethane, 1,1,1-trichloroethane or methylene chloride; chloroform; dimethyl sulfoxide; dimethyl formamide, acetonitrile; tetrahydrofuran; white spirits; mineral spirits; naphtha; n-methyl pyrrolidone; or a combination thereof.

The amount of vehicle can depend on various factors including the type of vehicle selected and the amount and type of other ingredients selected for the composition. However, the amount of vehicle may range from 1% to 99%, alternatively 2% to 50%, based on the weight of the composition.

The composition may optionally further comprise ingredient (T) a tackifying agent. The tackifying agent may comprise an aliphatic hydrocarbon resin such as a hydrogenated polyolefin having 6 to 20 carbon atoms, a hydrogenated terpene resin, a rosin ester, a hydrogenated rosin glycerol ester, or a combination thereof. Tackifying agents are commercially available. Aliphatic hydrocarbon resins are exemplified by ESCOREZ 1102, 1304, 1310, 1315, and 5600 from Exxon Chemical and Eastotac resins from Eastman, such as Eastotac H-100 having a ring and ball softening point of 100° C., Eastotac H-115E having a ring and ball softening point of 115° C., and Eastotac H-130L having a ring and ball softening point of 130° C. Hydrogenated terpene resins are exemplified by Arkon P 100 from Arakawa Chemicals and Wingtack 95 from Goodyear. Hydrogenated rosin glycerol esters are exemplified by Staybelite Ester 10 and Foral from Hercules. Examples of commercially available polyterpenes include Piccolyte A125 from Hercules. Examples of aliphatic/aromatic or cycloaliphatic/aromatic resins include ECR 149B or ECR 179A from Exxon Chemical. Alternatively, a solid tackifying agent (i.e., a tackifying agent having a ring and ball softening point above 25° C.), may be added. Suitable tackifying agents include any compatible resins or mixtures thereof such as (1) natural or modified rosins such, for example, as gum rosin, wood rosin, tall-oil rosin, distilled rosin, hydrogenated rosin, dimerized rosin, and polymerized rosin; (2) glycerol and pentaerythritol esters of natural or modified rosins, such, for example as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; (3) copolymers and terpolymers of natural terpenes, e.g., styrene/terpene and alpha methyl styrene/terpene; (4) polyterpene resins having a softening point, as determined by ASTM method E28,58T, ranging from 60° C.

to 150° C.; the latter polyterpene resins generally resulting from the polymerization of terpene hydrocarbons, such as the bicyclic monoterpene known as pinene, in the presence of Friedel-Crafts catalysts at moderately low temperatures; also included are the hydrogenated polyterpene resins; (5) phenolic modified terpene resins and hydrogenated derivatives thereof, for example, as the resin product resulting from the condensation, in an acidic medium, of a bicyclic terpene and phenol; (6) aliphatic petroleum hydrocarbon resins having a ring and ball softening point ranging from 60° C. to 135° C.; the latter resins resulting from the polymerization of monomers consisting of primarily of olefins and diolefins; also included are the hydrogenated aliphatic petroleum hydrocarbon resins; (7) alicyclic petroleum hydrocarbon resins and the hydrogenated derivatives thereof; and (8) aliphatic/aromatic or cycloaliphatic/aromatic copolymers and their hydrogenated derivatives. The amount of tackifying agent depends on various factors including the specific tackifying agent selected and the selection the other ingredients in the composition. However, the amount of tackifying agent may range from 0 parts to 20 parts based on the weight of the composition.

The composition may optionally further comprise ingredient (U), a corrosion inhibitor. Examples of suitable corrosion inhibitors include benzotriazole, mercaptabenzotriazole and commercially available corrosion inhibitors such as 2,5-dimercapto-1,3,4-thiadiazole derivative (CUVAN® 826) and alkylthiadiazole (CUVAN® 484) from R. T. Vanderbilt of Norwalk, Conn., U.S.A. When present, the amount of ingredient (U) may range from 0.05% to 0.5% based on the weight of the composition.

When selecting ingredients for the composition described above, there may be overlap between types of ingredients because certain ingredients described herein may have more than one function. For example, certain alkoxysilanes may be useful as filler treating agents and as adhesion promoters, certain fatty acid esters may be useful as plasticizers and may also be useful as filler treating agents, carbon black may be useful as a pigment, a flame retardant, and/or a filler, and nonreactive polydiorganosiloxanes such as polydimethylsiloxanes may be useful as extenders and as solvents.

The composition described above may be prepared as a one part composition, for example, by combining all ingredients by any convenient means, such as mixing. For example, a one-part composition may be made by optionally combining (e.g., premixing) the base polymer (B) and an extender (E) and mixing the resulting extended base polymer with all or part of the filler (F), and mixing this with a pre-mix comprising the crosslinker (C) and ingredient (A). Other additives such as (O) the anti-aging additive and (Q) the pigment may be added to the mixture at any desired stage. A final mixing step may be performed under substantially anhydrous conditions, and the resulting compositions are generally stored under substantially anhydrous conditions, for example in sealed containers, until ready for use.

Alternatively, the composition may be prepared as a multiple part (e.g., 2 part) composition when a crosslinker is present. In this instance the catalyst and crosslinker are stored in separate parts, and the parts are combined shortly before use of the composition. For example, a two part curable composition may be prepared by combining ingredients comprising (B) and (C) to form a first (curing agent) part by any convenient means such as mixing. A second (base) part may be prepared by combining ingredients comprising (A) and (B) by any convenient means such as mixing. The ingredients may be combined at ambient or elevated temperature and under ambient or anhydrous conditions, depending on various factors including whether a one part or multiple part composition is selected. The base part and curing agent part may be combined by any convenient means, such as mixing, shortly before use. The base part and curing agent part may be combined in relative amounts of base: curing agent ranging from 1:1 to 10:1.

The equipment used for mixing the ingredients is not specifically restricted. Examples of suitable mixing equipment may be selected depending on the type and amount of each ingredient selected. For example, agitated batch kettles may be used for relatively low viscosity compositions, such as compositions that would react to form gums or gels. Alternatively, continuous compounding equipment, e.g., extruders such as twin screw extruders, may be used for more viscous compositions and compositions containing relatively high amounts of particulates. Exemplary methods that can be used to prepare the compositions described herein include those disclosed in, for example, U.S. Patent Publications US 2009/0291238 and US 2008/0300358.

These compositions made as described above may be stable when the stored in containers that protect the compositions from exposure to moisture, but these compositions may react via condensation reaction when exposed to atmospheric moisture. Alternatively, when a low permeability composition is formulated, the composition may cure to form a cured product when moisture is released from a water release agent.

Compositions prepared as described above, and the reaction products thereof, have various uses. The ingredients described above may be used to prepare various types of composition comprising ingredients (A) and (B). The composition may further comprise one or more of the additional ingredients described above, depending on the type of composition and the desired end use of the composition and/or the reaction product of the composition. For example, the ingredients and methods described above may be used for chain extension processes to increase viscosity of the base polymer and/or form a gum, for example, when the base polymer has an average of one to two hydrolyzable groups per molecule. Alternatively, the ingredients and methods described above may be used to formulate curable compositions, for example, when the base polymer has two or more hydrolyzable groups per molecule and/or a crosslinker is present in the composition. The compositions described herein may be reacted by condensation reaction by exposure to moisture. For example, the compositions may react via condensation reaction when exposed to atmospheric moisture. Alternatively, the composition react moisture is released from a water release agent, when a water release agent is present. Each composition described herein reacts to form a reaction product. The reaction product may have a form selected from a gum, a gel, a rubber, or a resin.

EXAMPLES

These examples are intended to illustrate some embodiments of the invention and should not be interpreted as limiting the scope of the invention set forth in the claims. Reference examples should not be deemed to be prior art unless so indicated. The following ingredients were used in the examples below. Diethyl zinc ("ZnEt2") and diphenyl zinc ("ZnPh2") were purchased from Sigma-Aldrich of St. Louis, Mo., U.S.A. Zinc octanoate ("ZnOCT2") was purchased from City Chemicals LLC of West Haven, Conn., U.S.A. The crosslinker, n-butyltrimethoxysilane ("n-BuSi(O-Me)$_3$"), was purchased from Gelest, Inc. of Morrisville, Pa., U.S.A. The base polymer, which was a silanol terminated polydimethylsiloxane having a viscosity of 90 to 120 cSt and number average molecular weight, Mw, of 4200 ("PDMS 1"), was also purchased from Gelest, Inc.

Example 1

Formation of Metal-Ligand Complexes

Precursor solutions were prepared by mixing a Zn precursor described above at a 0.025 M concentration with toluene. The precursor solutions were colorless. Solutions of each ligand shown above in Table 1 were prepared by mixing each ligand at a 0.025 M concentration with toluene.

Each ligand solution prepared above was dispensed into pre-weighted 1 milliliter (mL) vials. Either 24 microliters (μL) of solution (corresponding to 0.6 micromole, μmol, of ligand) or 48 μL of solution (corresponding to 1.2 μmol of ligand) was used in each vial. Toluene in the vial was removed by leaving the vials uncapped in a box with flowing nitrogen overnight.

To each vial containing ligand (now without solvent) was added 24 μL of a precursor solution prepared as described above (corresponding to 0.6 μmol of precursor) to form a metal-ligand combination solution. The vial containing the metal-ligand combination solution was shaken at 60 revolutions per minute (rpm) at either 25° C. or 75° C. to form a metal-ligand complex.

Example 2

Condensation Reaction

Upon completion of the complexation reaction described above (in Example 1), 210 milligrams (mg) of PDMS 1 (corresponding to 235.7 μL or 50 μmol) and 17.8 mg of n-BuSi(O-Me)$_3$ (corresponding to 19.1 μL or 100 μmol) were injected into each vial containing a metal-ligand complex in a dry box. More toluene was then added to ensure total volume in each vial was 325 μL. Example 2 samples were prepared in this manner. Negative control samples were also prepared using the precursor described above, but no ligand. In the negative control samples, 210 mg of PDMS 1, 17.8 mg of n-BuSi(O-Me)$_3$, toluene (a sufficient amount to reach a total amount of 325 μL) were injected into a vial with the precursor. Additional negative control samples were also prepared using the ligands described above in Table 1, but no precursor. In these additional negative control samples, 210 mg of PDMS 1, 17.8 mg of n-BuSi(O-Me)$_3$, toluene (a sufficient amount to reach a total amount of 325 μL) were injected into a vial with the ligand.

The resulting vials containing compositions were taken out of the dry box into a hood and stirred for 1 min with vigorous stirring (several hundred rpm to homogenize each composition). The vials were then each covered with a perforated plate and placed into a humidity oven maintained at 30° C. with a relative humidity level (RH) of 95%.

After 48 hours in the humidity oven, the vials were removed from the humidity oven, and visual viscosity observations were recorded. The 48 hour visual viscosity measurements were determined by side to side visual comparison of the samples with vials containing different viscosity reference standards. The measurements were performed 48 hours after the samples were first exposed to moisture. The visual viscosity measurement value of each sample was assigned based on the vial of the reference standard it most closely matched. The reference standards were DOW CORNING® 200 fluids ("200 Fluid") of different viscosities, which were commercially available from Dow Corning Corporation of Midland, Mich., U.S.A. The visual viscosity description and standard to which it corresponded are shown below in Table 2. A value of 0 or 1 indicated that the sample did not exhibit condensation reaction in the 48 hours. A value of 2 to 5 indicated that condensation reaction increasingly occurred. Replicate experiments were subject to normal variation due to various factors, such as the operator performing the visual viscosity measurement and whether the replicate experiments were performed at different times.

TABLE 2

| Visual Viscosity Measurement | |
|---|---|
| 0—No Change | 50 cSt 200 Fluid |
| 1—Slightly viscous | 500 cSt 200 Fluid |
| 2—Viscous | 1000 cSt 200 Fluid |
| 3—Very viscous | 5000 cSt 200 Fluid |
| 4—Extremely viscous | 50000 cSt 200 Fluid |
| 5—No flow | No flow observed |

Table 3 showed the ligand, metal precursor Ligand: Metal Ratio, reaction conditions (time and temperature), and results (48 Hour Visual Viscosity and Appearance) for the samples prepared using the ligands in Table 1.

TABLE 3

| | | | | | | | |
|---|---|---|---|---|---|---|---|
| | | | | Examples | | | |
| Precursor | Ligand | Ligand μmoles | Ligand:Metal Ratio | Complexation Temperature (deg C.) | Complexation Time (min) | Appearance | 48 Hour Visual Viscosity Value |
| ZnEt2 | None | 0 | 0 | 25 | 60 | C | 1 |
| ZnEt2 | None | 0 | 0 | 75 | 30 | C | 1 |
| ZnEt2 | None | 0 | 0 | none | 0 | C | 1 |
| ZnOCT2 | None | 0 | 0 | 25 | 60 | C | 1 |
| ZnOCT2 | None | 0 | 0 | 75 | 30 | C | 1 |
| ZnOCT2 | None | 0 | 0 | none | 0 | C | 1 |
| ZnPh2 | None | 0 | 0 | none | 0 | C | 1 |
| ZnEt2 | 1 | 0.6 | 1 | 25 | 60 | H | 1 |
| ZnEt2 | 1 | 0.6 | 1 | 75 | 30 | H | 1 |
| ZnOCT2 | 1 | 0.6 | 1 | 25 | 60 | H | 3 |
| ZnOCT2 | 1 | 0.6 | 1 | 75 | 30 | H | 2 |
| ZnEt2 | 2 | 0.6 | 1 | 25 | 60 | H | 2 |
| ZnEt2 | 2 | 0.6 | 1 | 75 | 30 | H | 2 |

TABLE 3-continued

Examples

| Precursor | Ligand | Ligand µmoles | Ligand: Metal Ratio | Complexation Temperature (deg C.) | Complexation Time (min) | Appearance | 48 Hour Visual Viscosity Value |
|---|---|---|---|---|---|---|---|
| ZnOCT2 | 2 | 0.6 | 1 | 25 | 60 | H | 1 |
| ZnOCT2 | 2 | 0.6 | 1 | 75 | 30 | H | 1 |

In Table 3, values for appearance are defined as follows, 'H' means hazy, and 'C' means clear. For each ligand in Table 3, a negative control sample was prepared in which the ligand was tested according to the method of Example 2, except using no precursor. In each instance, the 48 Hour Visual Viscosity Value was 1.

Example 3

Formation of Metal-Ligand Complexes

A precursor solution was prepared by mixing Zinc 2-ethylhexanoate at a 0.025 M concentration with toluene. The precursor solutions were colorless. Solutions of each ligand shown in Table 6 by mixing the ligand at a 0.025 M concentration with toluene.

Each ligand solution prepared above was dispensed into a pre-weighted 8 milliliter (mL) vial. Either 240 microliters (µL) of solution (corresponding to 6 micromole, of µmol, of ligand) or 480 µL of solution (corresponding to 12 µmol of ligand) was used in each vial. Toluene in the vial was removed by leaving the vials uncapped in a box with flowing nitrogen overnight.

To each vial containing ligand (now without solvent) was added 240 µL of the precursor solution prepared as described above (corresponding to 6 µmol of precursor) to form a metal-ligand combination solution. The vial containing the metal-ligand combination solution was shaken at 60 revolutions per minute (rpm) at either 25° C. or 75° C. to form a metal-ligand complex.

Example 4

Condensation Reaction

Upon completion of the complexation reaction described above (in Example 3), 2037 milligrams (mg) of PDMS 1 and 129.9 mg of methyltrimethoxysilane (MTM) were injected into each vial containing a metal-ligand complex in a dry box. More toluene was then added to ensure total volume in each vial was 3 mL. Example 4 samples were prepared in this manner. Negative control samples were also prepared using the precursor described above, but no ligand. In the negative control samples, 2037 mg of PDMS 1, 129.9 mg of MTM, toluene (a sufficient amount to reach a total amount of 3 mL) were injected into a vial with the precursor. Additional negative control samples were also prepared using the ligands described above in Table 1, but no precursor. In these additional negative control samples, 2037 mg of PDMS 1, 129.9 mg of MTM, toluene (a sufficient amount to reach a total amount of 3 mL) were injected into a vial with the ligand.

The resulting vials containing compositions were taken out of the dry box into a hood and stirred for 1 min with vigorous stirring (several hundred rpm to homogenize each composition). The vials were then each covered with a perforated plate and placed into a humidity oven maintained at 30° C. with a relative humidity level (RH) of 95%.

After 48 hours in the humidity oven, the vials were removed from the humidity oven, and visual viscosity observations were recorded using the same method as in example 2. Results are below in Table 5.

TABLE 5

| Ligand No. | Ligand µmoles | Ligand: Metal Ratio | Complexation Temp (deg C.) | Complexation Time (min) | Appearance | 48 Hr. Visual Viscosity |
|---|---|---|---|---|---|---|
| 3 | 6 | 2 | 75 | 45 | clear | 2 |

The examples show that the catalysts described above for ingredient (A) and tested as described herein are capable of catalyzing condensation reaction. The composition described herein may be free of tin catalysts, such as those described above. Without wishing to be bound by theory, it is thought that the catalysts described herein as ingredient (A) may provide alternative, comparable, or better cure performance in some condensation reaction curable compositions, as compared to the same composition containing a tin catalyst.

The invention claimed is:

1. A composition comprising ingredients (A) and (B): where Ingredient (A) is a catalytically effective amount of a reaction product of a Zn precursor and a ligand, where the Zn precursor is distinct from a reaction product of the Zn precursor and the ligand, and where the ligand is selected from the group consisting of Ligands (a), (b), (c), and (d), where Ligand (a) has general formula (ii)

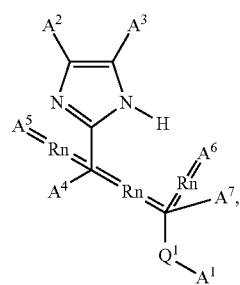

where a bond with 'Rn' in the formula represents a covalent single bond or an aromatic bond forming part of a ring structure, $Q^1$ is a heteroatom selected from O and S, each $A^2$ and each $A^3$ is independently selected from a hydrogen atom and a monovalent hydrocarbon group, each of $A^5$ and $A^6$ is independently selected from a hydrogen atom and a monovalent organic group, with the proviso that $A^5$ and $A^6$ may be bonded together to form a ring structure, each of $A^4$ and $A^7$ is independently selected from nothing, a hydrogen atom, and a monovalent organic group, $A^1$ is either a monovalent hydrocarbon group or a divalent linking group, with the proviso that when $A^1$ is a divalent linking group, then $A^1$ links the structure of general formula (ii) with a structure of formula (iii):

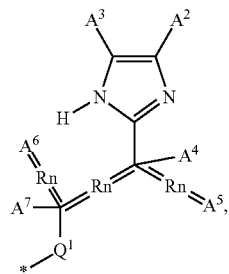

where * denotes a point of attachment, and $Q^1, A^2, A^3, A^4, A^5, A^6$, and $A^7$ are as defined above;

Ligand (b) is

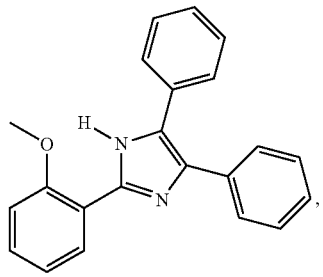 [SMILES: COc1ccccc1-c1nc(-c2ccccc2)c(-c2ccccc2)[nH]1]

Ligand (c) is

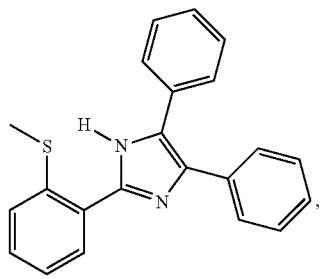 [SMILES: CSc1ccccc1-c1nc(-c2ccccc2)c(-c2ccccc2)[nH]1]

and Ligand (d) is

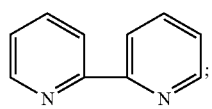 [SMILES: c1ccc(-c2ccccn2)nc1]

and,

Ingredient (B) is a silicon containing base polymer having an average, per molecule, of one or more hydrolyzable substituents, and Ingredient (A) is capable of catalyzing a condensation reaction of the hydrolyzable substituents on ingredient (B).

2. The composition of claim 1, where the condensation reaction produces a reaction product having a visual viscosity value ranging from 2 to 5 when tested according to the method of Example 2.

3. A composition comprising:

(A) a catalytically effective amount of a catalytically active reaction product of a reaction of ingredients i) and ii), where Ingredient i) is a Zn precursor of general formula Zn-$A_2$, where each A is independently a monovalent organic group; and Ingredient ii) is a ligand selected from the group consisting of ligands (a)-(d), where ligand (a) has general formula (ii)

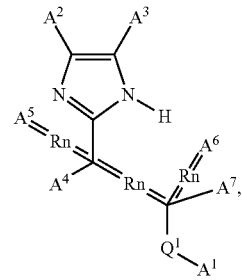

where a bond with 'Rn' in the formula represents a covalent single bond or an aromatic bond forming part of a ring structure, $Q^1$ is a heteroatom selected from O and S, each $A^2$ and each $A^3$ is independently selected from a hydrogen atom and a monovalent hydrocarbon group, each of $A^4, A^5, A^6$, and $A^7$ is independently selected from a hydrogen atom and a monovalent organic group, with the proviso that $A^5$ and $A^6$ may be bonded together to form a ring structure, $A^1$ is either a monovalent hydrocarbon group or a divalent linking group, with the proviso that when $A^1$ is a divalent linking group, then $A^1$ links the structure of general formula (ii) with a structure of formula (iii):

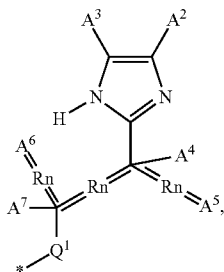

where * denotes a point of attachment, and $Q^1, A^2, A^3, A^4, A^5, A^6$, and $A^7$ are as defined above;

Ligand (b) is

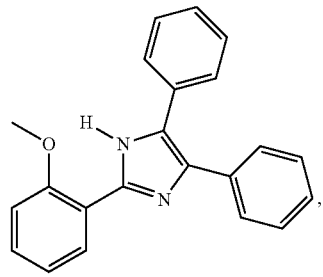 [SMILES: COc1ccccc1-c1nc(-c2ccccc2)c(-c2ccccc2)[nH]1]

ligand (c) is

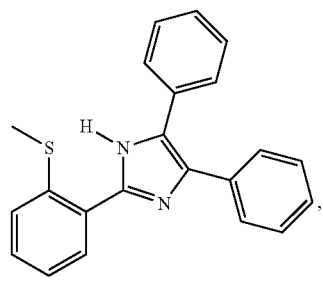 [SMILES: CSc1ccccc1-c1nc(-c2ccccc2)c(-c2ccccc2)[nH]1]

and ligand (d) is

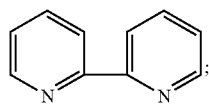 [SMILES: c1ccc(-c2ccccn2)nc1]

and (B) a silicon containing base polymer having an average, per molecule, of one or more hydrolyzable substituents, where the composition is capable of reacting via condensation reaction.

4. The composition of claim 3, where one of conditions (a) to (d) is met, where
Condition (a) is that each A is a carboxylic ester group; or
Condition (b) is that each A is octanoate; or
Condition (c) is that each A is an aryl group; or
Condition (d) is that each A is phenyl.

5. The composition of claim 1, further comprising at least one additional ingredient distinct from ingredients (A) and (B), where the at least one additional ingredient is selected from the group consisting of: (C) a crosslinker; (D) a drying agent; (E) an extender, a plasticizer, or a combination thereof; (F) a filler; (G) a treating agent; (H) a biocide; (J) a flame retardant; (K) a surface modifier; (L) a chain lengthener; (M) an endblocker; (N) a nonreactive binder; (O) an anti-aging additive; (P) a water release agent; (Q) a pigment; (R) a rheological additive; (S) a vehicle; (T) a tackifying agent; (U) a corrosion inhibitor; and a combination thereof.

6. A method for making the composition of claim 1 comprising: mixing ingredients comprising ingredient (A) and ingredient (B) so as to make the composition.

7. A method comprising: exposing the composition of claim 1 to moisture to prepare a reaction product.

8. A reaction product prepared by the method of claim 7, where the reaction product has a form selected from a gum, a gel, a rubber, and a resin; or
where the reaction product has a form selected from a gum, a gel, a rubber, and a resin and the reaction product is clear and/or colorless.

9. A method comprising: reacting
i) a Zn precursor of general formula $Zn-A_2$, where
each A is independently a monovalent organic group; or
each A is a carboxylic ester group; or
each A is octanoate; or
each A is an aryl group; or
each A is phenyl; and
ii) ligand selected from the group consisting of ligands (a), (b), and (c), where ligand (a) has general formula (ii)

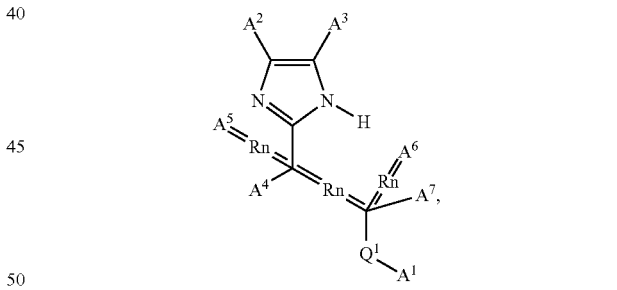

where a bond with 'Rn' in the formula represents a covalent single bond or an aromatic bond forming part of a ring structure, $Q^1$ is a heteroatom selected from O and S, each $A^2$ and each $A^3$ is independently selected from a hydrogen atom and a monovalent hydrocarbon group, each of $A^4$, $A^5$, $A^6$, and $A^7$ is independently selected from a hydrogen atom and a monovalent organic group, with the proviso that $A^5$ and $A^6$ may be bonded together to form a ring structure, $A^1$ is either a monovalent hydrocarbon group or a divalent linking group, with the proviso that when $A^1$ is a divalent linking group, then $A^1$ links the structure of general formula (ii) with a structure of formula (iii):

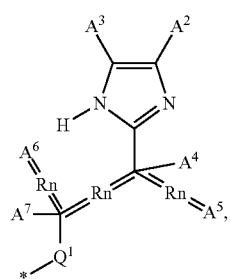

where * denotes a point of attachment, and $Q^1, A^2, A^3, A^4, A^5, A^6,$ and $A^7$ are as defined above;

ligand (b) is

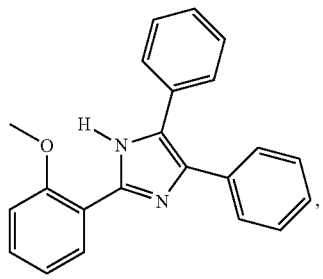 [SMILES: COc1ccccc1-c1nc(-c2ccccc2)c(-c2ccccc2)[nH]1]

and ligand (c) is

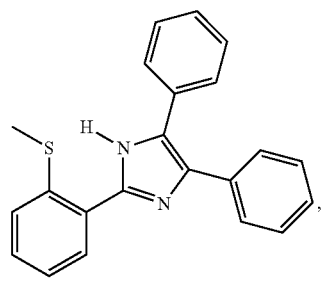 [SMILES: CSc1ccccc1-c1nc(-c2ccccc2)c(-c2ccccc2)[nH]1]

thereby making a reaction product.

10. The method of claim 9, further comprising heating the Zn precursor and the ligand.

11. The method of claim 9, further comprising removing a by-product from the reaction product to yield the Zn-ligand complex free of the by-product.

12. A reaction product prepared by the method of claim 10.

13. The reaction product of claim 10, where the reaction product comprises:
   a) a Zn-ligand complex, and
   b) a by-product from the reaction of the Zn precursor and the ligand, or from a side reaction therein.

14. A reaction product prepared by the method of claim 11.

* * * * *